United States Patent
Nguyen et al.

(10) Patent No.: US 10,148,171 B2
(45) Date of Patent: Dec. 4, 2018

(54) RECONFIGURABLE BIPOLAR OUTPUT CHARGE PUMP CIRCUIT AND INTEGRATED CIRCUIT INCLUDING THE SAME

(71) Applicant: SAMSUNG ELECTRONICS CO., LTD., Suwon-si, Gyeonggi-do (KR)

(72) Inventors: Huy Hieu Nguyen, Suwon-si (KR); Sang-Ho Kim, Suwon-si (KR); Dae-Yong Kim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/448,887

(22) Filed: Mar. 3, 2017

(65) Prior Publication Data

US 2018/0083531 A1    Mar. 22, 2018

(30) Foreign Application Priority Data

Sep. 20, 2016 (KR) .................. 10-2016-0120144

(51) Int. Cl.
*H02M 3/07* (2006.01)
*H02M 1/00* (2006.01)

(52) U.S. Cl.
CPC ...... *H02M 3/07* (2013.01); *H02M 2001/0025* (2013.01)

(58) Field of Classification Search
CPC ......... H02M 3/07; H02M 3/071; H02M 3/072
USPC .................................. 327/306, 308, 536
See application file for complete search history.

(56) References Cited

U.S. PATENT DOCUMENTS

| | | | | |
|---|---|---|---|---|
| 5,461,557 | A * | 10/1995 | Tamagawa | H02M 3/07 307/110 |
| 7,382,176 | B2 * | 6/2008 | Ayres | H02M 3/073 327/536 |
| 7,626,445 | B2 | 12/2009 | Lesso et al. | |
| 7,990,742 | B2 | 8/2011 | Lesso | |
| 8,384,467 | B1 | 2/2013 | O'Keeffe et al. | |
| 8,436,676 | B2 | 5/2013 | Shook et al. | |
| 8,542,055 | B2 | 9/2013 | Snowdon | |
| 8,699,247 | B2 | 4/2014 | Nguyen et al. | |
| 9,065,392 | B2 | 6/2015 | Myles | |
| 9,071,128 | B2 * | 6/2015 | Takida | H02M 3/07 |

(Continued)

*Primary Examiner* — William Hernandez
(74) *Attorney, Agent, or Firm* — Volentine, Whitt & Francos, PLLC

(57) ABSTRACT

A reconfigurable bipolar output charge pump circuit includes an input terminal configured to receive an input voltage. First and second terminals are connected to a first flying capacitor, and third and fourth terminals are connected to a second flying capacitor. First and second output terminals are respectively connected to first and second output capacitors and configured to respectively provide a positive output voltage and a negative output voltage. A switch network includes switches configured to connect the input terminal, the first to fourth terminals, and the first and second output terminals to each other in response to switch control signals. The switch network is configured to provide one of multiple potential charge pump modes. A controller generates the switch control signals in response to a mode control signal indicating one of the charge pump modes so that a magnitude of the positive output voltage and the negative output voltage becomes one of multiple predefined voltage levels.

20 Claims, 44 Drawing Sheets

(56) References Cited

U.S. PATENT DOCUMENTS

| | | | |
|---|---|---|---|
| 9,225,238 B2 | 12/2015 | Chevalier | |
| 9,225,239 B2 | 12/2015 | Williams | |
| 9,847,713 B2* | 12/2017 | Breece, III | H02M 3/07 |
| 2006/0244513 A1* | 11/2006 | Yen | H02M 3/07 327/536 |
| 2008/0044041 A1* | 2/2008 | Tucker | H02M 3/07 381/120 |
| 2008/0150620 A1* | 6/2008 | Lesso | H02M 3/07 327/536 |
| 2009/0039947 A1* | 2/2009 | Williams | H02M 3/07 327/536 |
| 2009/0326624 A1* | 12/2009 | Melse | A61N 1/378 607/116 |
| 2010/0176872 A1* | 7/2010 | Saikusa | H02J 7/0044 327/536 |
| 2012/0170770 A1* | 7/2012 | Lesso | H02M 3/07 381/107 |
| 2013/0181521 A1* | 7/2013 | Khlat | H02M 3/07 307/31 |
| 2014/0240034 A1* | 8/2014 | Myles | H02M 3/07 327/536 |
| 2014/0312710 A1 | 10/2014 | Li | |

* cited by examiner

FIG. 5

| ST2 | ST1 | CHARGE PUMP MODE |
|---|---|---|
| 0 | 0 | +VDD |
| 0 | 1 | ±2VDD/3 |
| 1 | 0 | ±VDD/2 |
| 1 | 1 | ±VDD/3 |

FIG. 8

| SWITCH | ±VDD | | ±2VDD/3 | | | ±VDD/2 | | ±VDD/3 | | |
|---|---|---|---|---|---|---|---|---|---|---|
| | Φ1 | Φ2 | Φ1 | Φ2 | Φ3 | Φ1 | Φ2 | Φ1 | Φ2 | Φ3 |
| S1 | ON | ON | ON | – | – | ON | – | ON | – | – |
| S2 | ON | ON | – | – | ON | – | ON | – | – | ON |
| S3 | ON | ON | – | ON | – | – | ON | – | ON | – |
| S4 | – | – | ON | – | – | ON | – | ON | – | – |
| S5 | ON | – | ON | ON | – | ON | ON | ON | ON | – |
| S6 | – | ON | – | – | ON | – | – | – | – | – |
| S7 | – | – | – | – | – | – | – | – | – | ON |
| S8 | ON | – | ON | – | – | ON | – | ON | – | – |
| S9 | – | ON | – | ON | ON | – | ON | – | ON | – |

– : OFF

PHASE 1

PHASE 2

PHASE 1

PHASE 2

PHASE 1

PHASE 2

RECONFIGURABLE BIPOLAR OUTPUT CHARGE PUMP CIRCUIT AND INTEGRATED CIRCUIT INCLUDING THE SAME

CROSS-REFERENCE TO RELATED APPLICATION

This U.S. non-provisional patent application claims priority under 35 USC § 119 to Korean Patent Application No. 10-2016-0120144, filed on Sep. 20, 2016 in the Korean Intellectual Property Office, the disclosure of which is incorporated herein in its entirety by reference.

BACKGROUND

1. Technical Field

The present disclosure relates to a charge pump. More particularly, the present disclosure relates to a reconfigurable bipolar output charge pump circuit that provides a positive output voltage and a negative output voltage having multiple output levels and an integrated circuit including the same.

2. Description of the Related Art

A charge pump is a direct current to direct current (DC-DC) converter and uses capacitors as energy storage elements to generate a voltage higher or lower than an input voltage. When a charge pump is included in a mobile device, it is necessary to miniaturize the charge pump, and a charge pump with high-performance and high-efficiency is necessary to extend a battery's life.

SUMMARY

According to an aspect of the present disclosure, a reconfigurable bipolar output charge pump circuit includes an input terminal configured to receive an input voltage, first and second terminals configured to be connected to a first flying capacitor, and third and fourth terminals configured to be connected to a second flying capacitor. The reconfigurable bipolar output charge pump circuit also includes first and second output terminals, a switch network, and a controller. The first and second output terminals are configured to be respectively connected to first and second output capacitors and respectively provide a positive output voltage and a negative output voltage. The switch network includes multiple switches configured to variably connect the input terminal, the first to fourth terminals, and the first and second output terminals to each other in response to switch control signals. The switch network provides (e.g., implements, makes possible, is reconfigured to operate in) one of multiple possible charge pump modes. The variable connections described herein can be connections of fewer than all of the input terminal, the first to fourth terminals, and the first and second output terminals to each other at the same time. The controller is configured to generate the switch control signals in response to a mode control signal indicating one of the charge pump modes so that a magnitude of the positive output voltage and the negative output voltage becomes one of multiple possible predefined voltage levels.

According to another aspect of the present disclosure, an integrated circuit includes a charge pump circuit configured to provide a positive output voltage and a negative output voltage from an input voltage, and an amplifier configured to receive the positive output voltage and the negative output voltage, amplify an input signal, and provide an output signal. The charge pump circuit includes an input terminal configured to receive the input voltage, first and second terminals configured to be connected to a first flying capacitor, and third and fourth terminals configured to be connected to a second flying capacitor. The charge pump circuit also includes first and second output terminals, a switch network, and a controller. The first and second output terminals are configured to be respectively connected to first and second output capacitors and respectively provide the positive output voltage and the negative output voltage. The switch network includes multiple switches configured to variably connect the input terminal, the first to fourth terminals, and the first and second output terminals to each other in response to switch control signals. The switch network provides (e.g., implements, makes possible, is reconfigured to operate in) one of multiple possible charge pump modes. The variable connections described herein can be connections of fewer than all of the input terminal, the first to fourth terminals, and the first and second output terminals to each other at the same time. The controller is configured to generate the switch control signals in response to a mode control signal indicating one of the charge pump modes so that a magnitude of the positive output voltage and the negative output voltage becomes one of multiple possible predefined voltage levels.

BRIEF DESCRIPTION OF THE DRAWINGS

Embodiments of the present disclosure will be more clearly understood from the following detailed description taken in conjunction with the accompanying drawings in which:

FIG. 5 is a table showing charge pump modes corresponding to a mode control signal input to the reconfigurable bipolar output charge pump circuit of FIG. 4, according to an embodiment of the present disclosure;

FIG. 8 is a table showing switch states defining charge pump modes, according to an embodiment of the present disclosure;

DETAILED DESCRIPTION OF THE EMBODIMENTS

Figure 1:
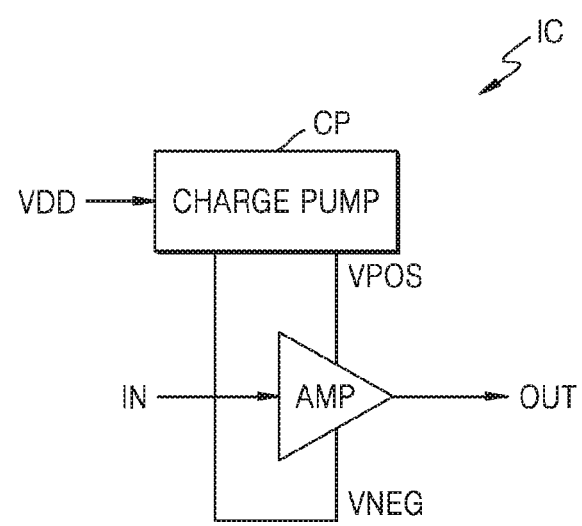
FIG. 1 shows an integrated circuit, according to an embodiment of the present disclosure.

FIG. 1 shows an integrated circuit IC, according to an embodiment of the present disclosure.

Referring to FIG. 1, the integrated circuit IC may include a charge pump CP and an amplifier AMP. In an embodiment, the charge pump CP and the amplifier AMP may be implemented as a single chip. In an embodiment, the charge pump CP and the amplifier AMP may be implemented as a single package. In this case, some elements of the charge pump CP and the amplifier AMP may be implemented as a chip, and other elements of the charge pump CP may be disposed outside the chip.

The charge pump CP may generate a positive output voltage VPOS and a negative output voltage VNEG from an input voltage VDD. The input voltage VDD may be a single voltage, that is, a single rail supply voltage. The charge pump CP may generate dual rail supply voltages including the positive output voltage VPOS and the negative output voltage VNEG, that is, bipolar supply voltages.

In an embodiment, the charge pump CP may provide various charge pump modes according to voltage levels of the positive output voltage VPOS and the negative output voltage VNEG. Accordingly, the charge pump CP may be referred to as a "multi-level charge pump." In detail, the charge pump CP may generate the positive output voltage VPOS and the negative output voltage VNEG corresponding to one of multiple predefined output voltage levels. A charge pump mode may be determined according to an output voltage level. Therefore, the charge pump CP may be referred to as a "reconfigurable bipolar output charge pump."

In an embodiment, multiple charge pump modes may include a first charge pump mode, a second charge pump mode, and a third charge pump mode. In the first charge pump mode, a magnitude of the positive output voltage VPOS and the negative output voltage VNEG corresponds to the input voltage VDD. In the second charge pump mode, the magnitude of the positive output voltage VPOS and the negative output voltage VNEG corresponds to 1/m of the input voltage VDD. In the third charge pump mode, the magnitude of the positive output voltage VPOS and the negative output voltage VNEG corresponds to 1/n of the input voltage VDD. For the charge pump modes, m and n may be different integers equal to or greater than 2.

In an embodiment, the charge pump modes may include the first charge pump mode, the second charge pump mode, and the third charge pump mode. In the first charge pump mode, the magnitude of the positive output voltage VPOS and the negative output voltage VNEG corresponds to the input voltage VDD. In the second charge pump mode, the magnitude of the positive output voltage VPOS and the negative output voltage VNEG corresponds to 1/m of the input voltage VDD. In the third charge pump mode, the magnitude of the positive output voltage VPOS and the negative output voltage VNEG corresponds to n/m of the input voltage VDD. For the charge pump modes, m and n may be different integers equal to or greater than 2. For example, the multiple predefined output voltage levels may be ±VDD, ±2VDD/3, ±VDD/2, and/or ±VDD/3, but the output voltage levels described herein are not limited thereto.

The amplifier AMP may be driven by the positive output voltage VPOS and the negative output voltage VNEG. The amplifier AMP may provide an output signal OUT by amplifying an input signal IN. In an embodiment, the integrated circuit IC may be an audio codec, and the amplifier AMP may be a headphone driver for driving a headphone by amplifying an input audio signal. For example, the amplifier AMP may be a class-G headphone driver. The amplifier AMP will be described in detail below with reference to FIGS. 2A to 3D.

Figure 2A:
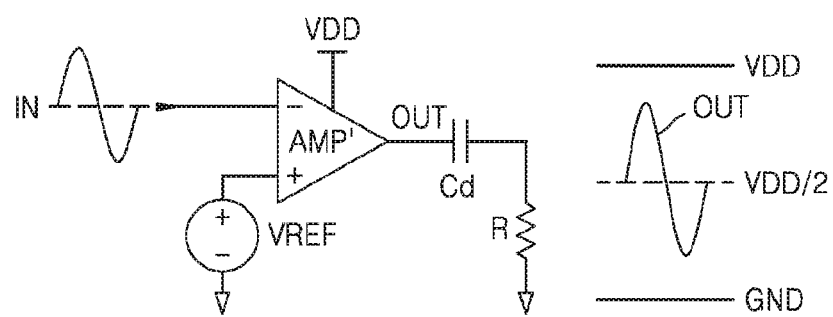
FIGS. 2A and 2B respectively show an amplifier driven by a single power rail and an amplifier driven by a dual-power rail, according to an embodiment of the present disclosure.
Figure 2B:
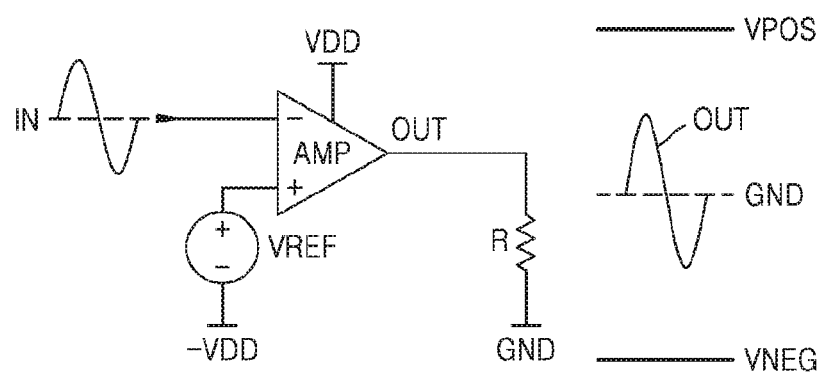

FIG. 2A shows an amplifier AMP' driven by a single power rail. FIG. 2B shows an amplifier AMP driven by a dual-power rail, according to an embodiment of the present disclosure.

Referring to FIG. 2A, the amplifier AMP' is provided with power from a single power rail, that is, an input voltage VDD. The amplifier AMP' provides an output signal OUT by amplifying an input signal IN. The output signal OUT of the amplifier AMP' is biased at VDD/2 which is higher than a ground voltage, and thus a quiescent current may be high. Therefore, a direct current (DC) blocking capacitor Cd is necessary at an output terminal of the amplifier AMP'. A high-capacity DC blocking capacitor Cd is necessary to ensure that a low-frequency audio signal is transferred to a load without attenuation. Accordingly, implementation costs and a size of the amplifier AMP' may increase.

Referring to FIG. 2B, the amplifier AMP may be provided with power from a dual-power rail, that is, a positive output voltage VDD and a negative voltage −VDD. The amplifier AMP may provide an output signal OUT by amplifying an input signal IN. The amplifier AMP may correspond to, for example, the amplifier AMP of FIG. 1. A supply voltage provided to the amplifier AMP may correspond to the positive output voltage VPOS and the negative output voltage VNEG of FIG. 1. The output signal OUT of the amplifier AMP is biased at the ground voltage, and thus a quiescent current may be low. Therefore, no DC blocking capacitor is necessary at an output terminal of the amplifier AMP. Accordingly, implementation costs and a size of the amplifier AMP may be reduced.

FIGS. 3A to 3D are graphs showing examples of output signals of various kinds of headphone amplifiers.

Figure 3A:
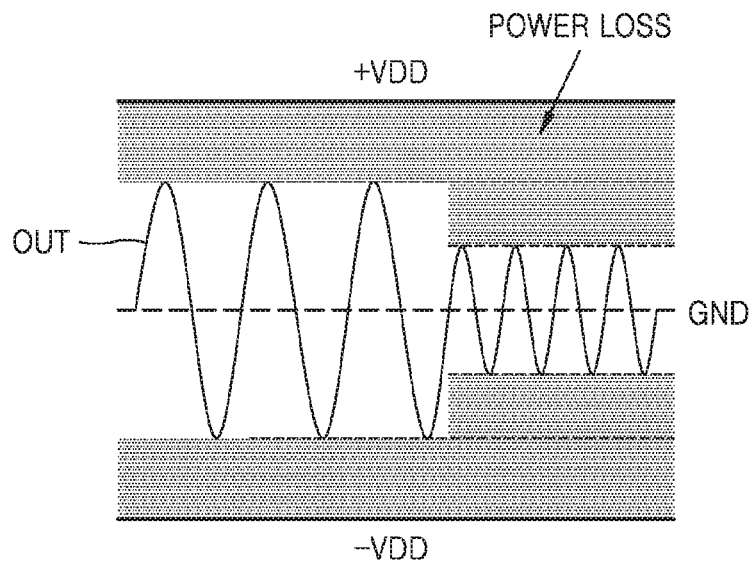
FIGS. 3A to 3D are graphs showing examples of output signals of various kinds of headphone amplifiers.
Figure 3B:
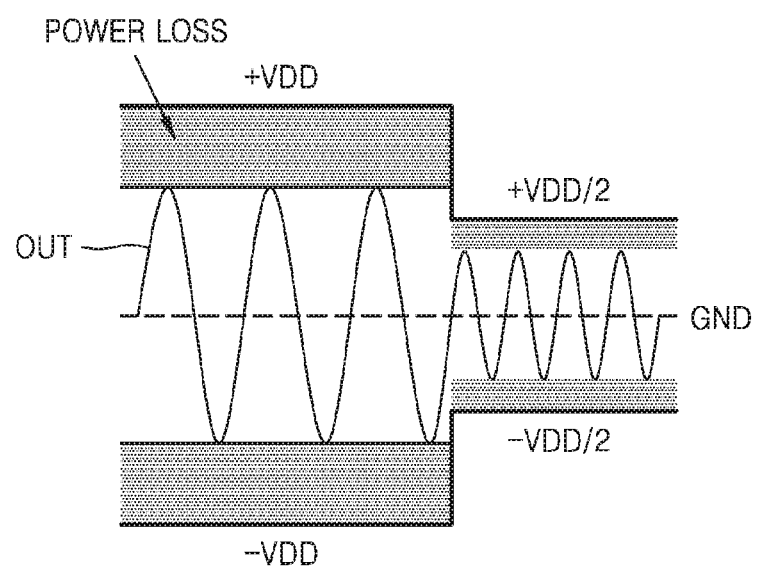
Figure 3C:
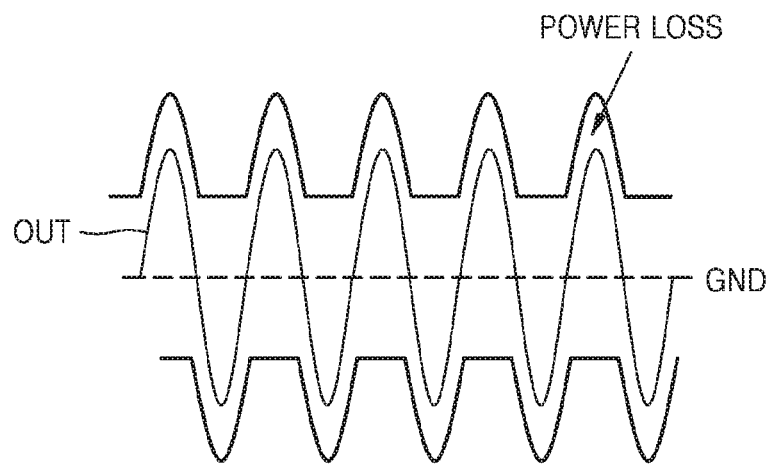

Referring to FIG. 3A, for example, in the case of a class-AB amplifier, a power voltage supplied to the amplifier is fixed at ±VDD. When an output signal OUT is attenuated, a voltage difference between the power voltage (±VDD) and the output signal OUT increases. Accordingly, a power loss increases, and power efficiency is reduced. Referring to FIG. 3B, for example, in the case of a class-G2 amplifier, a power voltage supplied to the amplifier may be changed to ±VDD or ±VDD/2. When an output signal OUT is attenuated, a power loss is reduced, and power efficiency may be increased. Referring to FIG. 3C, for example, in the case of a class-H amplifier, a power voltage supplied to the amplifier may track an output signal OUT. At this time, power efficiency may be remarkably increased, but implementation of the class-H amplifier involves a buck converter having an expensive external inductor.

Figure 3D:
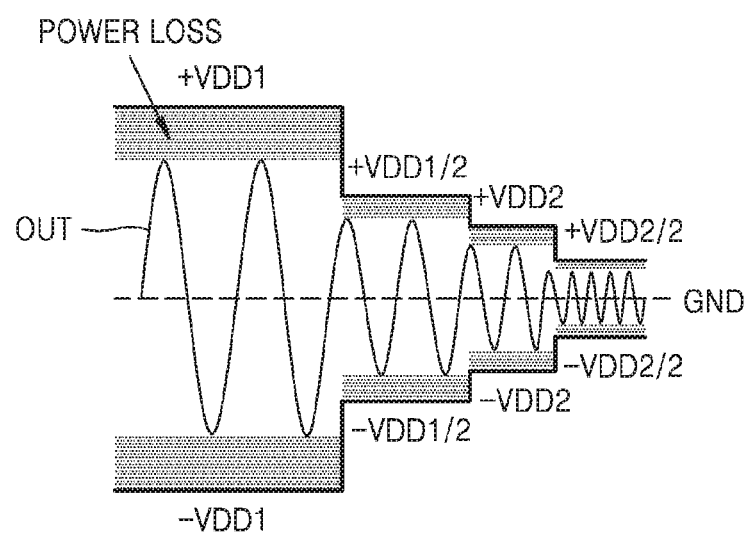

Referring to FIGS. 1 and 3D together, according to an embodiment of the present disclosure, the charge pump CP may generate one of multiple predefined power voltages. For example, the multiple generated power voltages may be ±VDD, ±1VDD/3, ±1VDD/2, and ±2VDD/3. The charge pump CP may be adaptively reconfigured to the output signal OUT of the amplifier AMP. In detail, the charge pump CP may provide the amplifier AMP with one of the predefined power voltages selected according to a level of the output signal OUT of the amplifier AMP. Accordingly, when the output signal OUT is attenuated, a magnitude of the power voltage provided to the amplifier AMP is reduced. Therefore, according to an embodiment of the present disclosure, the power efficiency may be increased by reducing the power loss even when an expensive buck converter is not included.

Figure 4:
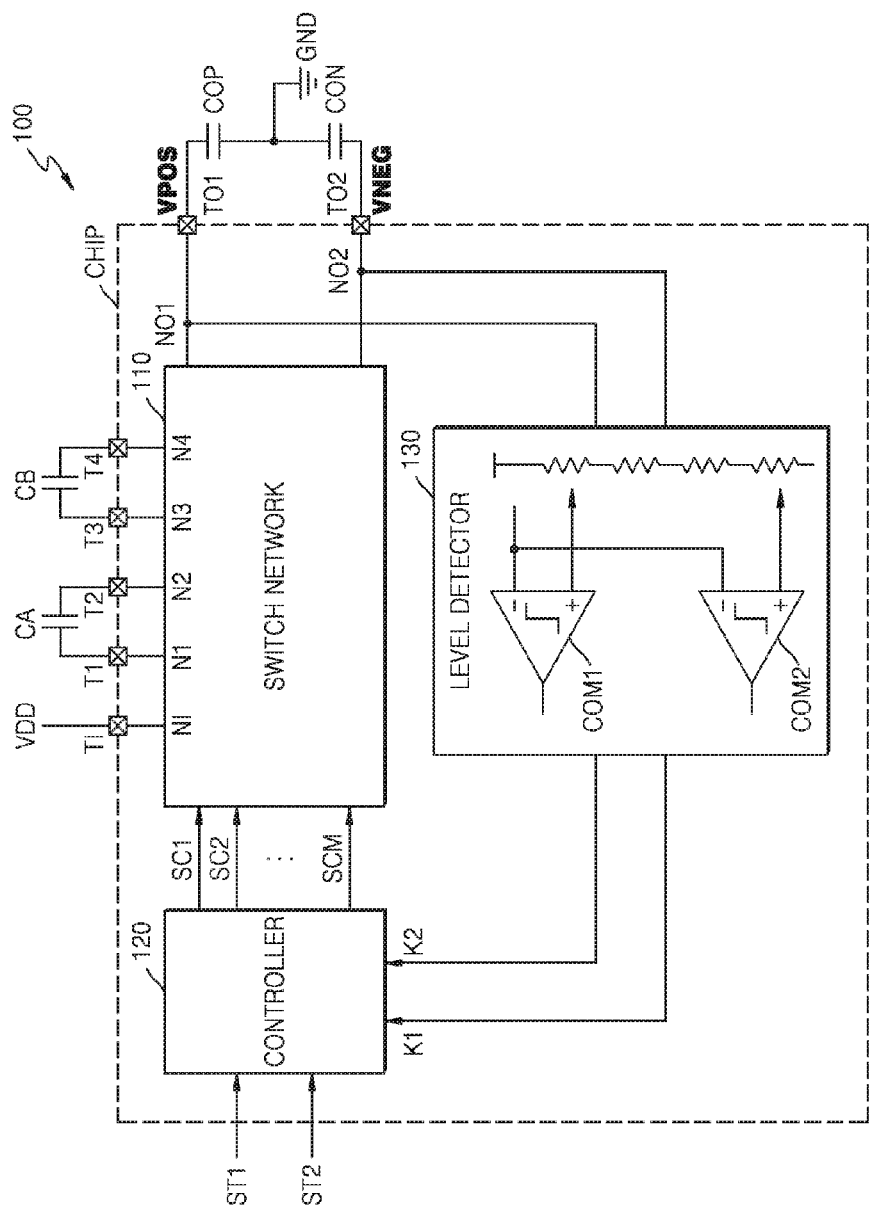
FIG. 4 is a block diagram showing a reconfigurable bipolar output charge pump circuit, according to an embodiment of the present disclosure.

FIG. 4 is a block diagram showing a reconfigurable bipolar output charge pump circuit 100, according to an embodiment of the present disclosure. The reconfigurable bipolar output charge pump circuit 100 of FIG. 4 may correspond to one implementation example of the charge pump CP of FIG. 1, and the above descriptions of FIGS. 1 to 3D may also be applied to the present embodiment.

Referring to FIG. 4, the reconfigurable bipolar output charge pump circuit 100 (for convenience, referred to as a "charge pump circuit" below) may include first and second flying capacitors CA and CB, first and second output capacitors COP and CON, a switch network 110, and a controller 120. Also, the charge pump circuit 100 may further include a level detector 130. In an embodiment, the switch network 110, the controller 120, and the level detector 130 may be implemented as a single chip CHIP. The first and second flying capacitors CA and CB and the first and second output capacitors COP and CON may be disposed outside the chip CHIP.

The charge pump circuit 100 may further include an input terminal TI configured to receive an input voltage VDD, first and second terminals T1 and T2 configured to be connected to the first flying capacitor CA, and third and fourth terminals T3 and T4 configured to be connected to the second flying capacitor CB. The input terminal TI and the first to fourth terminals T1 to T4 may be respectively connected to an input node NI and first to fourth nodes N1 to N4 of the switch network 110. The first and second flying capacitors CA and CB may not be permanently connected to the input voltage VDD. The first and second flying capacitors CA and CB may be connected to or separated from the input voltage VDD based on an operating state of the charge pump circuit 100. The first and second flying capacitors CA and CB may store charges to be transferred to the first and second output capacitors COP and CON.

Also, the charge pump circuit 100 may further include a first output terminal TO1 configured to be connected to the first output capacitor COP and provide a positive output voltage VPOS, and a second output terminal TO2 configured to be connected to the second output capacitor CON and provide a negative output voltage VNEG. The first and second output terminals TO1 and TO2 may be respectively connected to the first and second output nodes NO1 and NO2. The first and second output nodes NO1 and NO2 are shown outside of the switch network 110 in FIG. 4, but may be part of the switch network 110 in embodiments. The first and second output capacitors COP and CON may be referred to as reservoir capacitors.

The switch network 110 may include multiple switches configured to variably connect the input terminal NI, the first to fourth terminals N1 to N4, and the first and second output terminals NO1 and NO2 to each other in response to switch control signals SCI to SCM. The switch network 110 may provide (e.g., implement, make possible, be reconfigured to operate in) one of multiple possible charge pump modes. Accordingly, the multiple switches may connect the input terminal TI, the first to fourth terminals T1 to T4, and the first and second output terminals TO1 and T02, to each other in response to the switch control signals SCI to SCM.

The controller 120 may generate the switch control signals SCI to SCM in response to a mode control signal indicating one of the multiple possible charge pump modes so that a magnitude of the positive output voltage VPOS and the negative output voltage VNEG becomes one of multiple predefined voltage levels. In an embodiment, the mode control signal may be implemented with at least two bits, and may include, for example, a first mode control bit ST1 and a second mode control bit ST2. However, the mode control signal described herein is not limited thereto, and the number of mode control bits included in the mode control signal may be changed according to the number of the predefined voltage levels, that is, the number of charge pump modes. Operations of the controller 120 will be described below with reference to FIG. 5.

The level detector 130 may be connected to the first output node NO1 or the second output node NO2, and may detect the positive output voltage VPOS or the negative output voltage VNEG to thereby control a switching frequency. In detail, the level detector 130 may include first and second comparators COM1 and COM2, receive the positive output voltage VPOS or the negative output voltage VNEG at negative input terminals of the first and second comparators COM1 and COM2, and compare the received output voltage with different reference voltage levels. Here, the different reference voltage levels may be acquired through a voltage divider implemented with multiple resistances.

When the positive output voltage VPOS or the negative output voltage VNEG has a high voltage level, the level detector 130 may generate a switching frequency control signal for reducing the switching frequency. Meanwhile, when the positive output voltage VPOS or the negative output voltage VNEG has a low voltage level, the level detector 130 may generate a switching frequency control signal for increasing the switching frequency. The switching frequency control signal may include first and second switching frequency control bits K1 and K2. A switching frequency of a clock signal, for example, a clock signal CK1 of FIG. 7A or a clock signal CK2 of FIG. 7B, may be changed by the first and second frequency control bits K1 and K2.

FIG. 5 is a table showing charge pump modes corresponding to the mode control signal of FIG. 4, according to an embodiment of the present disclosure.

Referring to FIGS. 4 and 5 together, in an embodiment, a charge pump mode of the charge pump circuit 100 may be determined by the first and second mode control bits ST1 and ST2. Therefore, the charge pump circuit 100 is reconfigurable according to a charge pump mode determined by the first and second mode control bits ST1 and ST2, and may generate bipolar multi-level output voltages according to the charge pump mode.

For example, when both the first and second mode control bits ST1 and ST2 are 0, the charge pump circuit 100 may provide a first charge pump mode in which bipolar output voltages having the same level as the input voltage VDD (i.e., ±VDD) are generated. When the first mode control bit ST1 is 1 and the second mode control bit ST2 is 0, the charge pump circuit 100 may provide a second charge pump mode in which bipolar output voltages having a level corresponding to ⅔ of the input voltage VDD (i.e., ±2VDD/3) are generated. When the first mode control bit ST1 is 0 and the second mode control bit ST2 is 1, the charge pump circuit 100 may provide a third charge pump mode in which bipolar output voltages having a level corresponding to ½ of the input voltage VDD (i.e., ±VDD/2) are generated. When both the first and second mode control bits ST1 and ST2 are 1, the charge pump circuit 100 may provide a fourth charge pump mode in which bipolar output voltages having a level corresponding to ⅓ of the input voltage VDD (i.e., ±VDD/3) are generated.

Figure 6:
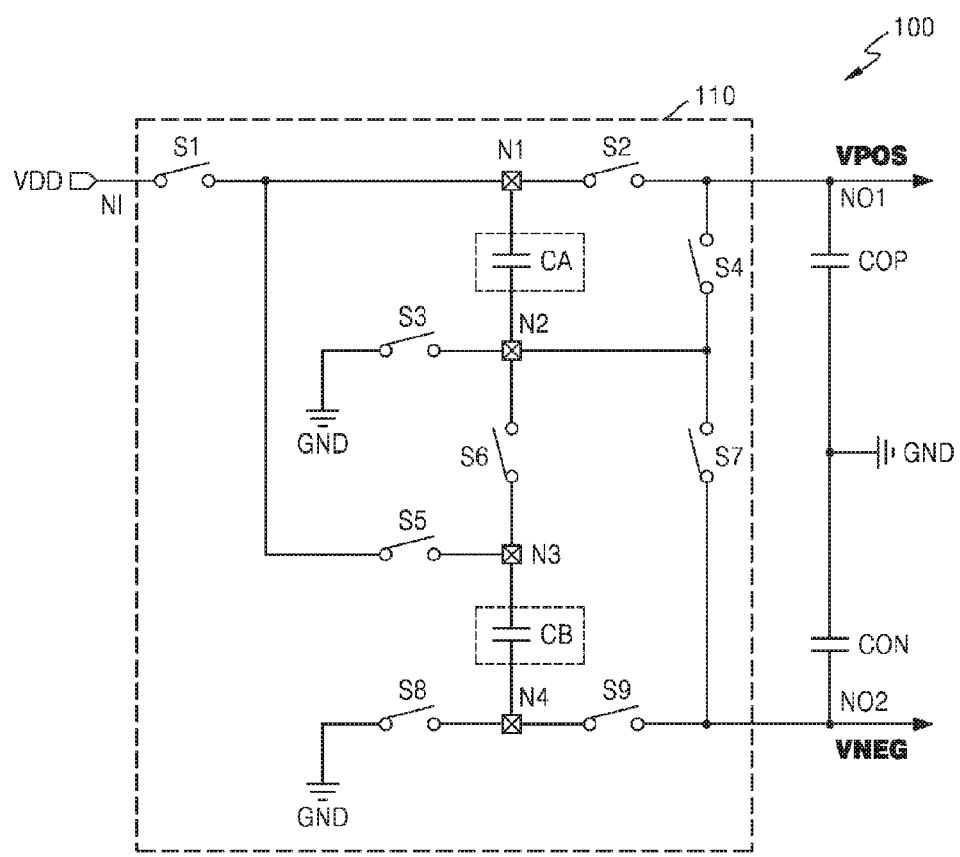
FIG. 6 is a circuit diagram showing a reconfigurable bipolar output charge pump circuit, according to an embodiment of the present disclosure.

FIG. 6 is a circuit diagram showing a reconfigurable bipolar output charge pump circuit 100, according to an embodiment of the present disclosure.

Referring to FIG. 6, the charge pump circuit 100 may include first and second flying capacitors CA and CB, first and second output capacitors COP and CON, and a switch network 110. The charge pump circuit 100 according to the present embodiment may correspond to one implementation example of the charge pump circuit 100 of FIG. 4, and the above descriptions of FIGS. 4 and 5 may also be applied to the present embodiment. For convenience, description will be made assuming that the input node NI, the first to fourth nodes N1 to N4, and the first and second output nodes NO1 and NO2 respectively include the input terminal TI, the first to fourth terminals T1 to T4, and the first and second output terminals TO1 and TO2.

The switch network 110 may include first to ninth switches S1 to S9. The first switch S1 may be disposed between the input node NI and the first node N1, and may connect the input node NI and the first node N1. The second switch S2 may be disposed between the first node N1 and the first output node NO1, and may connect the first node N1 to the first output node NO1. The third switch S3 may be disposed between the second node N2 and a ground terminal GND, and may connect the second node N2 to the ground terminal GND. The fourth switch S4 may be disposed between the second node N2 and the first output node NO1, and may connect the second node N2 to the first output node NO1. The fifth switch S5 may be disposed between one end of the first switch S1 and the third node N3, and may connect the third node N3 to the first switch S1. The sixth switch S6 may be disposed between the second node N2 and the third node N3, and may connect the second node N2 to the third node N3. The seventh switch S7 may be disposed between the second node N2 and the second output node NO2, and may connect the second node N2 to the second output node NO2. The eighth switch S8 may be disposed between the fourth node N4 and the ground terminal GND, and may connect the fourth node N4 to the ground node GND. The ninth switch S9 may be disposed between the fourth node N4 and the second output node NO2, and may connect the fourth node N4 to the second output node NO2.

In this way, the charge pump circuit 100 may include the switch network 110 including the nine switches S1 to S9, the two flying capacitors CA and CB, and the two output capacitors COP and CON in the present embodiment. The charge pump circuit 100 may be reconfigured according to a charge pump mode selected by a mode control signal including, for example, first and second mode control bits ST1 and ST2 (see FIG. 4). Accordingly, the charge pump circuit 100 may generate bipolar output voltages VPOS and VNEG corresponding to one of multiple possible voltage levels from an input voltage VDD.

According to the present embodiment, in the charge pump circuit 100, two or three switches may be connected to one current path. Therefore, in each current path, a switch-on resistance may be reduced in comparison to a related art, and accordingly, an output impedance may be reduced. Consequently, power efficiency of the charge pump circuit 100 may be increased, and performance may be improved. Also, according to the present embodiment, the total number of switches included in the charge pump circuit 100 may be reduced in comparison to the related art, and accordingly, a size of a chip including the charge pump circuit 100 may be reduced.

Figure 7A:
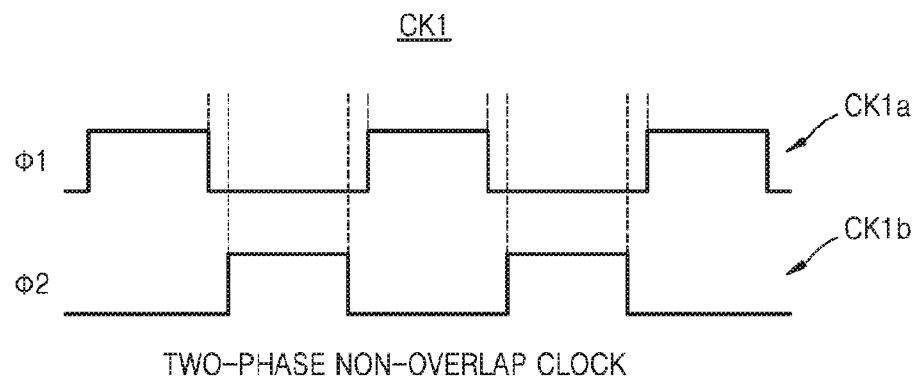
FIGS. 7A and 7B respectively show examples of a clock signal controlling two phases, according to an embodiment of the present disclosure, and a clock signal controlling three phases, according to an embodiment of the present disclosure.
Figure 7B:
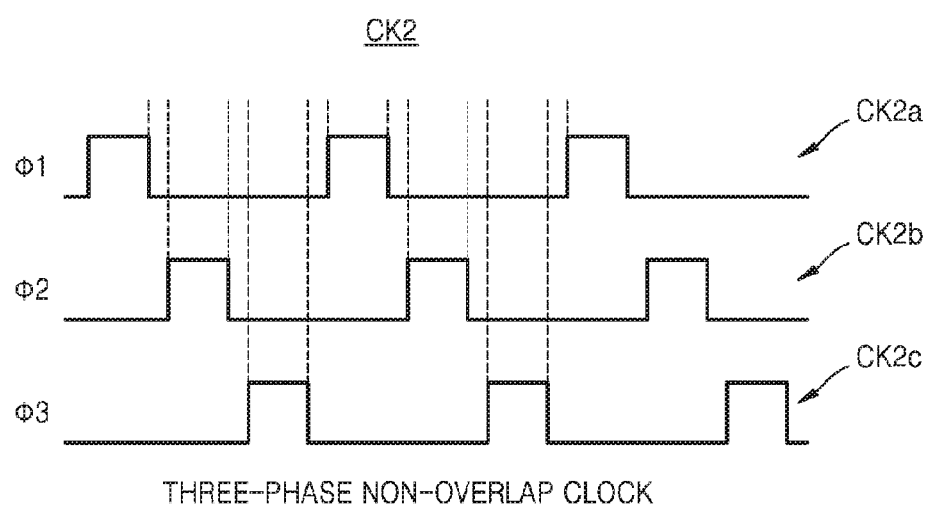

FIG. 7A shows an example of a clock signal controlling two phases, according to an embodiment of the present disclosure. FIG. 7B shows an example of a clock signal controlling three phases, according to an embodiment of the present disclosure.

Referring to FIG. 7A, a clock signal CK1 may include a first clock signal CK1a for controlling a first phase and a second clock signal CK1b for controlling a second phase. Here, the first clock signal CK1a and the second clock signal CK1b may not overlap each other. When a charge pump mode has two phases, for example, in the cases of first and third charge pump modes of FIG. 8, the switch network 110 may be controlled by using the clock signal CK1. On-periods of the first clock signal CK1a may correspond to a first phase ϕ1, and on-periods of the second clock signal CK1b may correspond to a second phase ϕ2. In an embodiment, the first clock signal CK1a and the second clock signal CK1b may have the same on-period length. In an embodiment, the first clock signal CK1a and the second clock signal CK1b may have different on-period lengths.

Referring to FIG. 7B, a clock signal CK2 may include a first clock signal CK2a for controlling a first phase, a second clock signal CK2b for controlling a second phase, and a third clock signal CK2c for controlling a third phase. Here, the first to third clock signals CK2a to CK2c may not overlap one another. When a charge pump mode has three phases, for example, in the cases of second and fourth charge pump modes of FIG. 8, the switch network 110 may be controlled by using the clock signal CK2. On-periods of the first clock signal CK2a may correspond to a first phase ϕ1. On-periods of the second clock signal CK2b may correspond to a second phase ϕ2. On-periods of the third clock signal CK2c may correspond to a third phase ϕ3. In an embodiment, the first to third clock signals CK2a to CK2c may have the same on-period length. In an embodiment, at least two of the first to third clock signals CK2a to CK2c may have different on-period lengths.

FIG. 8 is a table showing switch states defining charge pump modes, according to an embodiment of the present disclosure.

Referring to FIGS. 5 to 8 together, in the first charge pump mode, the charge pump circuit 100 may generate ±VDD, and the switch network 110 may be controlled by using the clock signal CK1 of FIG. 7A. The first phase corresponds to a charged state, and the charge pump circuit 100 may operate according to the first phase φ1. The second phase corresponds to a charge-transfer state or a discharged state, and the charge pump circuit 100 may operate according to the second phase φ2. In the first phase, the first to third switches S1 to S3 and the fifth and eighth switches S5 and S8 may be turned on. In the second phase, the first to third switches S1 to S3 and the sixth and ninth switches S6 and S9 may be turned on.

In the second charge pump mode, the charge pump circuit 100 may generate ±2VDD/3, and the switch network 110 may be controlled by using the clock signal CK2 of FIG. 7B. The first phase corresponds to the charged state, and the charge pump circuit 100 may operate according to the first phase φ1. The second and third phases correspond to the charge-transfer state or the discharged state, and the charge pump circuit 100 may operate according to each of the second and third phases φ2 and φ3. The first, fourth, fifth, and eighth switches S1, S4, S5, and S8 may be turned on in the first phase. The third, fifth, and ninth switches S3, S5, and S9 may be turned on in the second phase. The second, sixth, and ninth switches S2, S6, and S9 may be turned on in the third phase.

In the third charge pump mode, the charge pump circuit 100 may generate ±VDD/2, and the switch network 110 may be controlled by using the clock signal CK1 of FIG. 7A. The first phase corresponds to the charged state, and the charge pump circuit 100 may operate according to the first phase φ1. The second phase corresponds to the charge-transfer state or the discharged state, and the charge pump circuit 100 may operate according to the second phase φ2. In the first phase, the first, fourth, fifth, and eighth switches S1, S4, S5, and S8 may be turned on. In the second phase, the second, third, fifth, and ninth switches S2, S3, S5, and S9 may be turned on.

In the fourth charge pump mode, the charge pump circuit 100 may generate ±VDD/3, and the switch network 110 may be controlled by using the clock signal CK2 of FIG. 7B. The first phase corresponds to the charged state, and the charge pump circuit 100 may operate according to the first phase φ1. The second and third phases correspond to the charge-transfer state or the discharged state, and the charge pump circuit 100 may operate according to each of the second and third phases φ2 and φ3. The first, fourth, fifth, and eighth switches S1, S4, S5, and S8 may be turned on in the first phase. The third, fifth, and ninth switches S3, S5, and S9 may be turned on in the second phase. The second and seventh switches S2 and S7 may be turned on in the third phase.

Operations in the first to fourth charge pump modes, according to an embodiment of the present disclosure will be described in detail below with reference to FIG. 9A to FIG. 18B. The above descriptions of FIGS. 4 to 8 may be applied to the following embodiments, and duplicate descriptions will be omitted.

Figure 9A:
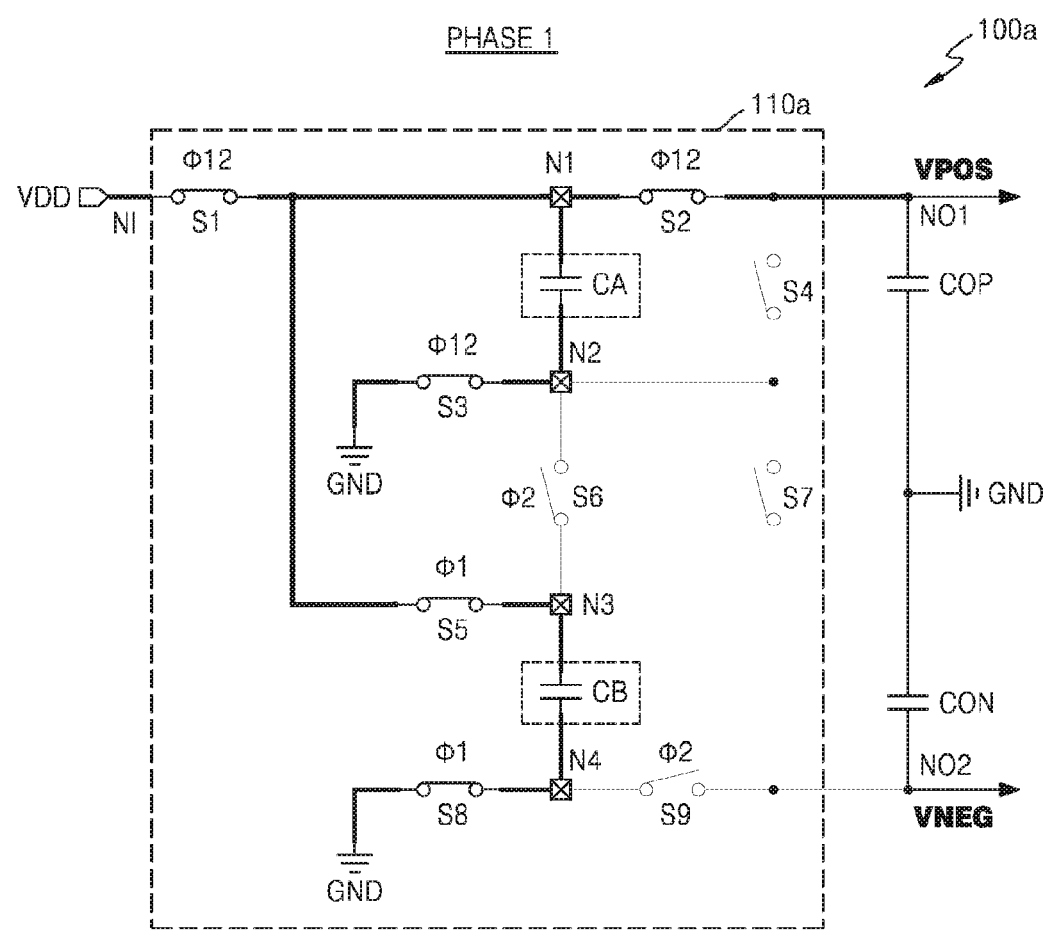
FIGS. 9A to 10B are circuit diagrams showing charge pump circuits providing a first charge pump mode, according to an embodiment of the present disclosure.
Figure 9B:
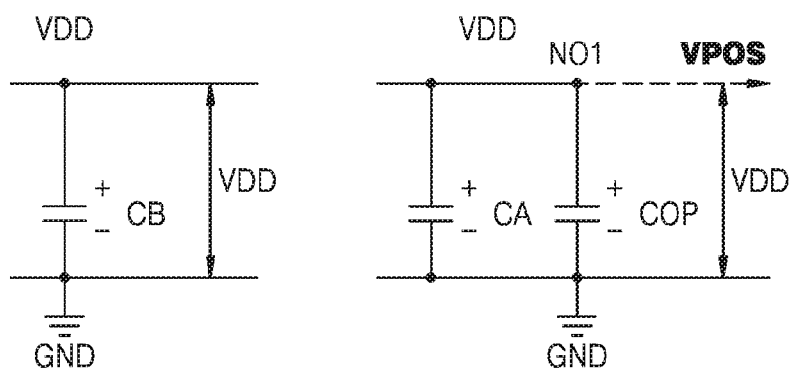

FIG. 9A is a circuit diagram showing a charge pump circuit 100a operating in the first phase of the first charge pump mode, according to an embodiment of the present disclosure, and FIG. 9B shows an equivalent circuit diagram of FIG. 9A.

Referring to FIGS. 9A and 9B, in the first phase, the first to third switches S1 to S3 are turned on to form current paths for the first flying capacitor CA and the first output capacitor COP. The first, fifth, and eighth switches S1, S5, and S8 are turned on to form a current path for the second flying capacitor CB. In the first phase, each of the first and second flying capacitors CA and CB may be charged by the input voltage VDD to a voltage level corresponding to VDD. In detail, the second flying capacitor CB may be connected between the input node NI and the ground terminal GND and charged to VDD. The first flying capacitor CA and the first output capacitor COP may be connected in parallel between the input node NI and the ground terminal GND so that each of the first flying capacitor CA and the first output capacitor COP may be charged to VDD.

Figure 10A:
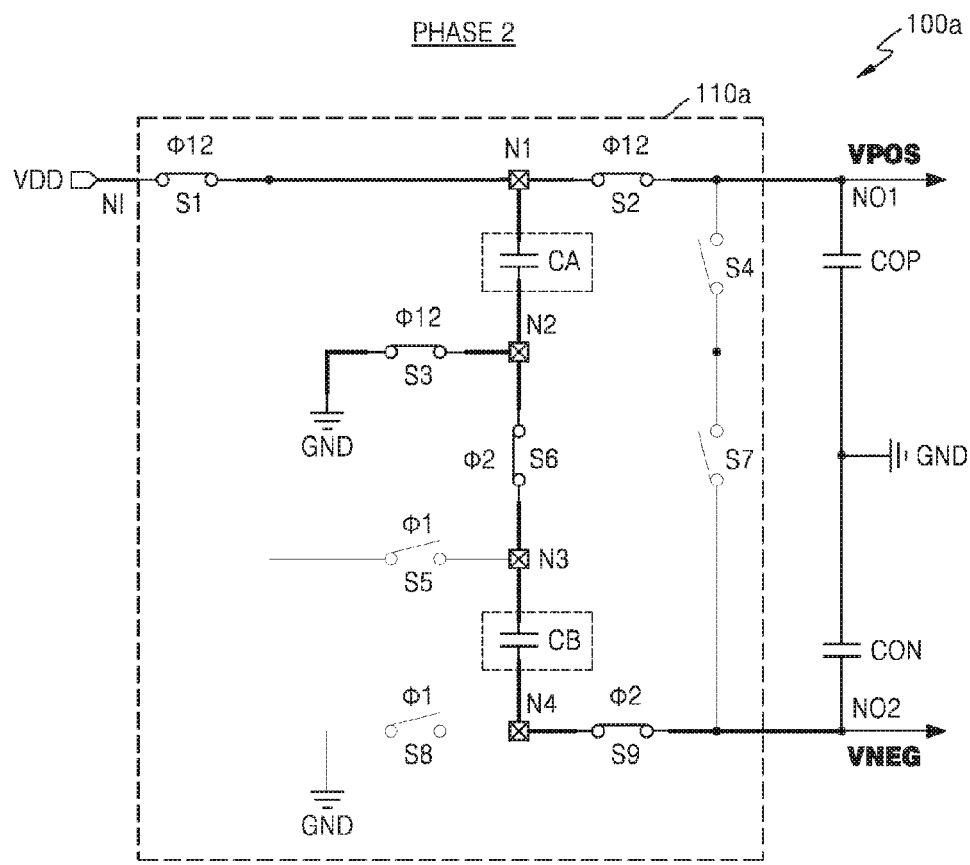
Figure 10B:
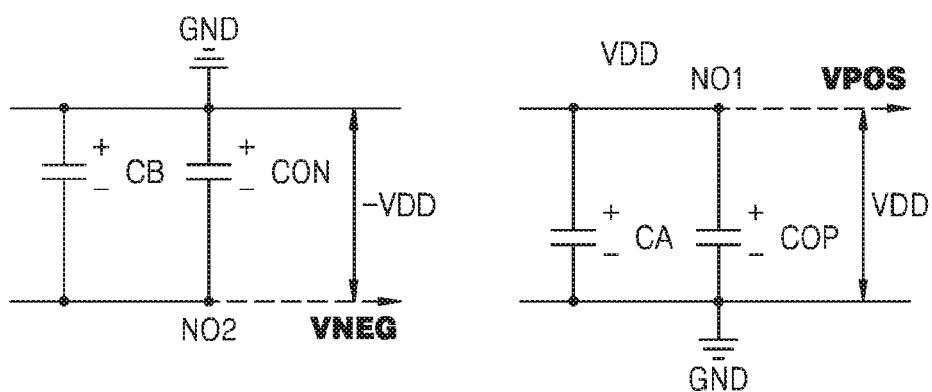

FIG. 10A is a circuit diagram showing the charge pump circuit 100a operating in the second phase of the first charge pump mode, according to an embodiment of the present disclosure, and FIG. 10B shows an equivalent circuit diagram of FIG. 10A.

Referring to FIGS. 10A and 10B, in the second phase, the first to third switches S1 to S3 are turned on to form current paths for the first flying capacitor CA and the first output capacitor COP. The sixth and ninth switches S6 and S9 are turned on to form a current path for the second flying capacitor CB and the second output capacitor CON. The positive output voltage VPOS corresponding to +VDD may be provided at the first output node NO1, and the negative output voltage VNEG corresponding to −VDD may be provided at the second output node NO2.

Figure 11A:
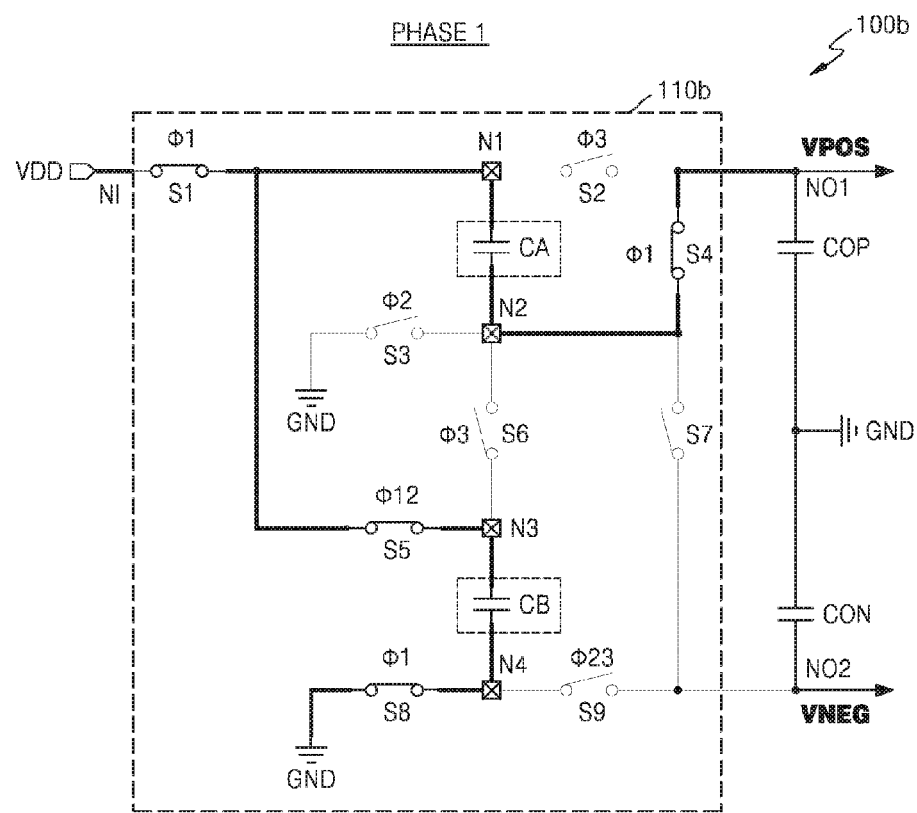
FIGS. 11A to 13B are circuit diagrams showing charge pump circuits providing a second charge pump mode, according to an embodiment of the present disclosure.
Figure 11B:
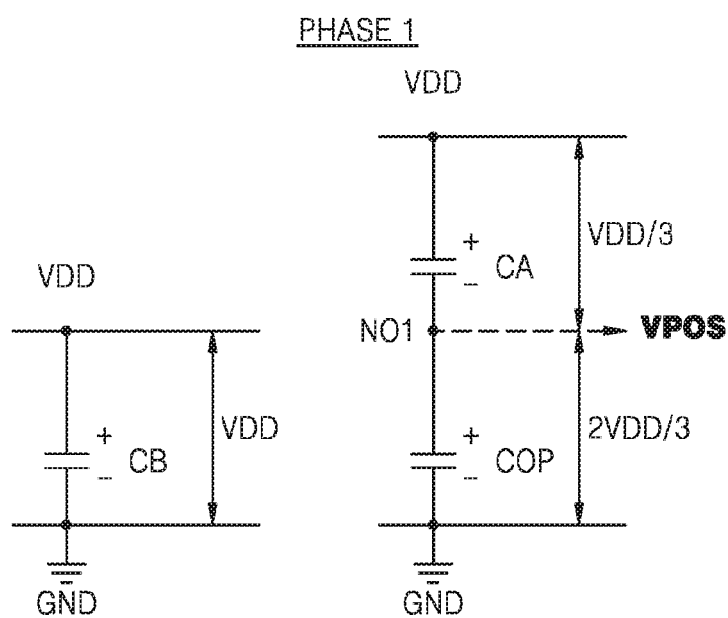

FIG. 11A is a circuit diagram showing a charge pump circuit 100b operating in the first phase of the second charge pump mode, according to an embodiment of the present disclosure, and FIG. 11B shows an equivalent circuit diagram of FIG. 11A.

Referring to FIGS. 11A and 11B, in the first phase, the first and fourth switches S1 and S4 are turned on to form a current path for the first flying capacitor CA and the first output capacitor COP. The first, fifth, and eighth switches S1, S5, and S8 are turned on to form a current path for the second flying capacitor CB. In the first phase, the first and second flying capacitors CA and CB may be charged by the input voltage VDD to voltage levels corresponding to VDD/3 and VDD, respectively. In detail, the second flying capacitor CB may be connected between the input node NI and the ground terminal GND and charged to VDD. The first flying capacitor CA and the first output capacitor COP may be connected in series between the input node NI and the ground terminal GND so that the first flying capacitor CA may be charged to VDD/3 and the first output capacitor COP may be charged to 2VDD/3.

Figure 12A:
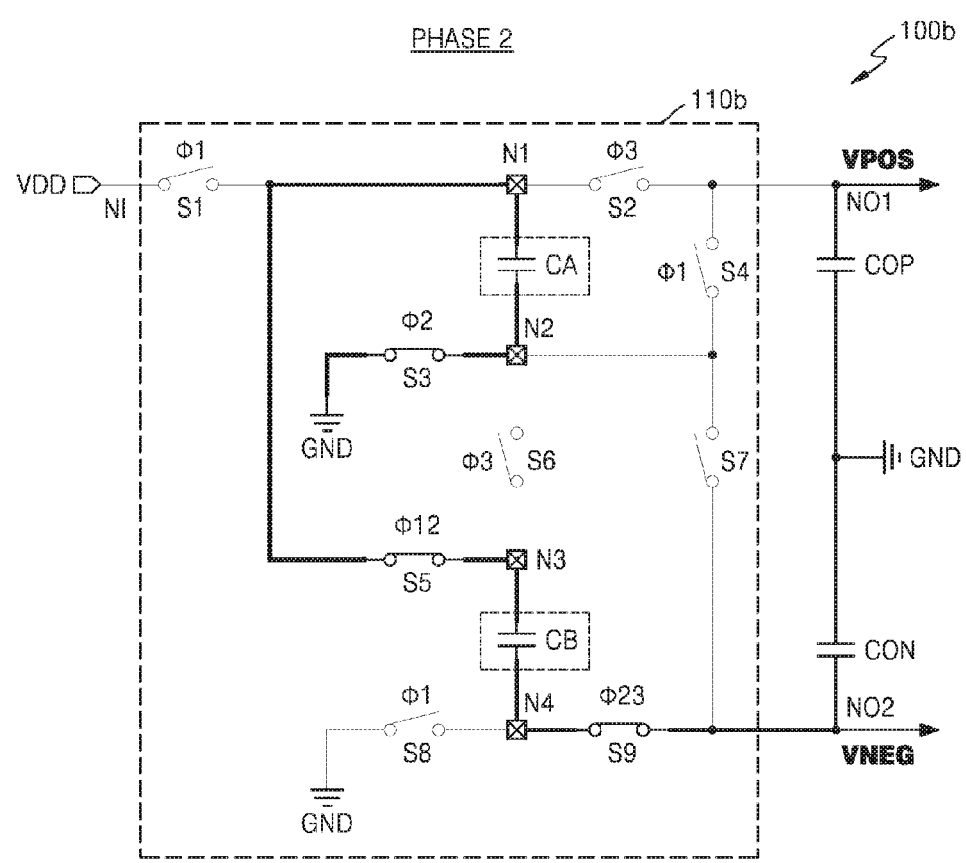
Figure 12B:
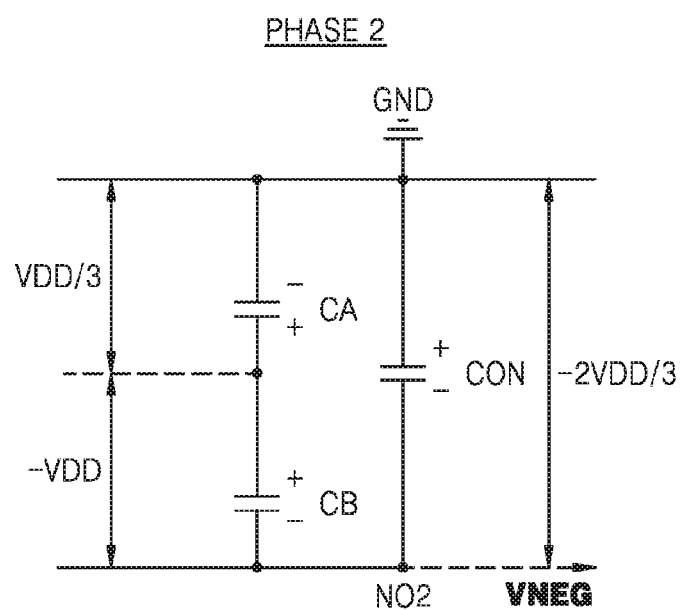

FIG. 12A is a circuit diagram showing the charge pump circuit 100b operating in the second phase of the second charge pump mode, according to an embodiment of the present disclosure, and FIG. 12B shows an equivalent circuit diagram of FIG. 12A.

Referring to FIGS. 12A and 12B, in the second phase, the third, fifth, and ninth switches S3, S5, and S9 are turned on to form current paths for the first and second flying capacitors CA and CB and the second output capacitor CON. The negative output voltage VNEG corresponding to −2VDD/3 may be provided at the second output node NO2. In the second phase, charge charged in the first and second flying capacitors CA and CB may be transferred to the second output capacitor CON.

Figure 13A:
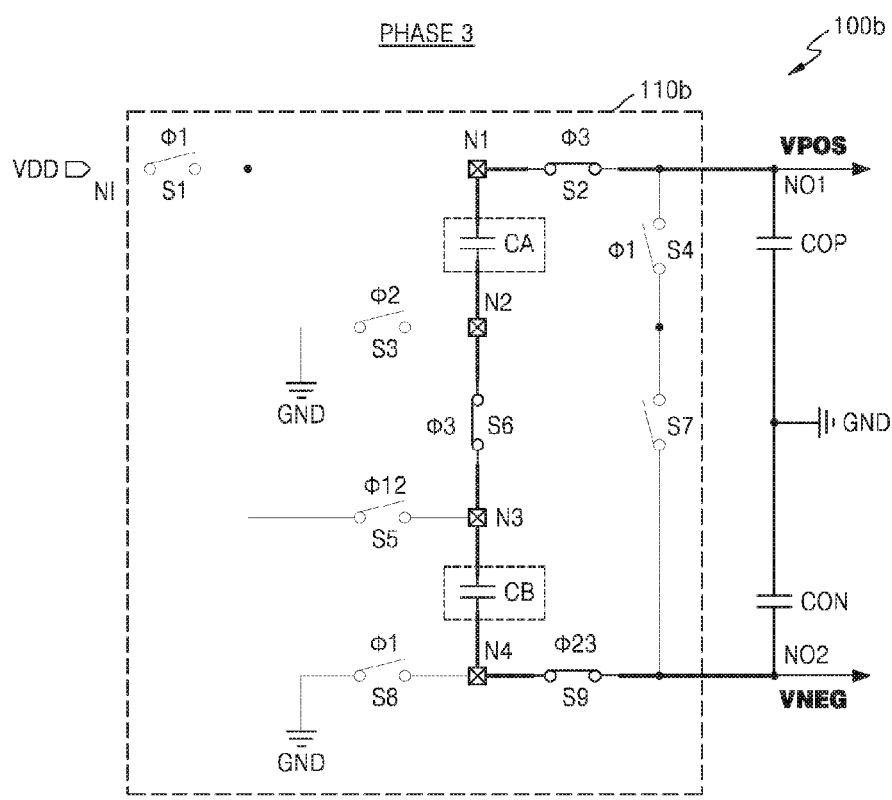
Figure 13B:
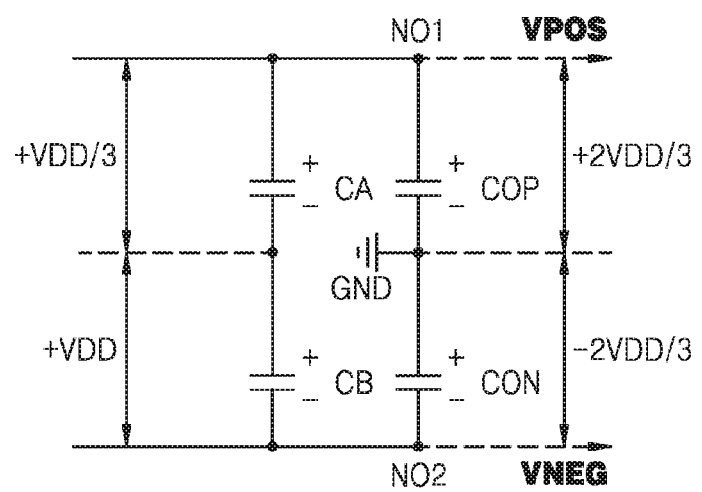

FIG. 13A is a circuit diagram showing the charge pump circuit 100b operating in the third phase of the second charge pump mode, according to an embodiment of the present disclosure, and FIG. 13B shows an equivalent circuit diagram of FIG. 13A.

Referring to FIGS. 13A and 13B, in the third phase, the second, sixth, and ninth switches S2, S6, and S9 are turned on to form a current path for the first and second flying capacitors CA and CB and the first and second output capacitors COP and CON. The positive output voltage VPOS corresponding to 2VDD/3 may be provided at the first output node NO1, and the negative output voltage VNEG corresponding to −2VDD/3 may be provided at the second output node NO2.

Figure 14A:
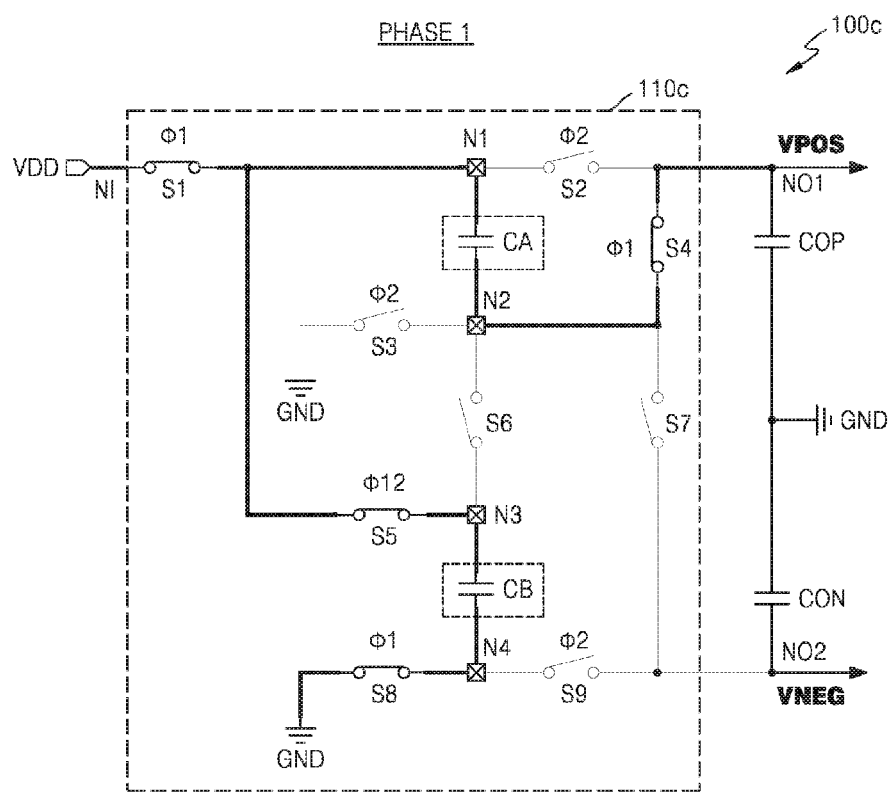
FIGS. 14A to 15B are circuit diagrams showing charge pump circuits providing a third charge pump mode, according to an embodiment of the present disclosure.
Figure 14B:
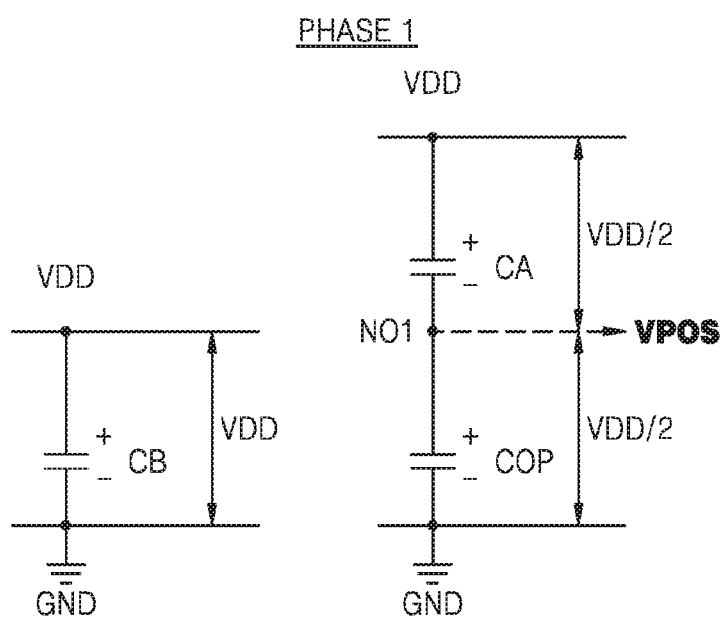

FIG. 14A is a circuit diagram showing a charge pump circuit 100c operating in the first phase of the third charge pump mode, according to an embodiment of the present disclosure, and FIG. 14B shows an equivalent circuit diagram of FIG. 14A.

Referring to FIGS. 14A and 14B, in the first phase, the first and fourth switches S1 and S4 are turned on to form a current path for the first flying capacitor CA and the first output capacitor COP. The first, fifth, and eighth switches S1, S5, and S8 are turned on to form a current path for the second flying capacitor CB. In the first phase, the first and second flying capacitors CA and CB may be charged by the input voltage VDD to voltage levels corresponding to VDD/2 and VDD, respectively. In detail, the second flying capacitor CB may be connected between the input node NI and the ground terminal GND and charged to VDD. Also, the first flying capacitor CA and the first output capacitor COP may be connected in series between the input node NI and the ground terminal GND so that each of the first flying capacitor CA and the first output capacitor COP may be charged to VDD/2.

Figure 15A:
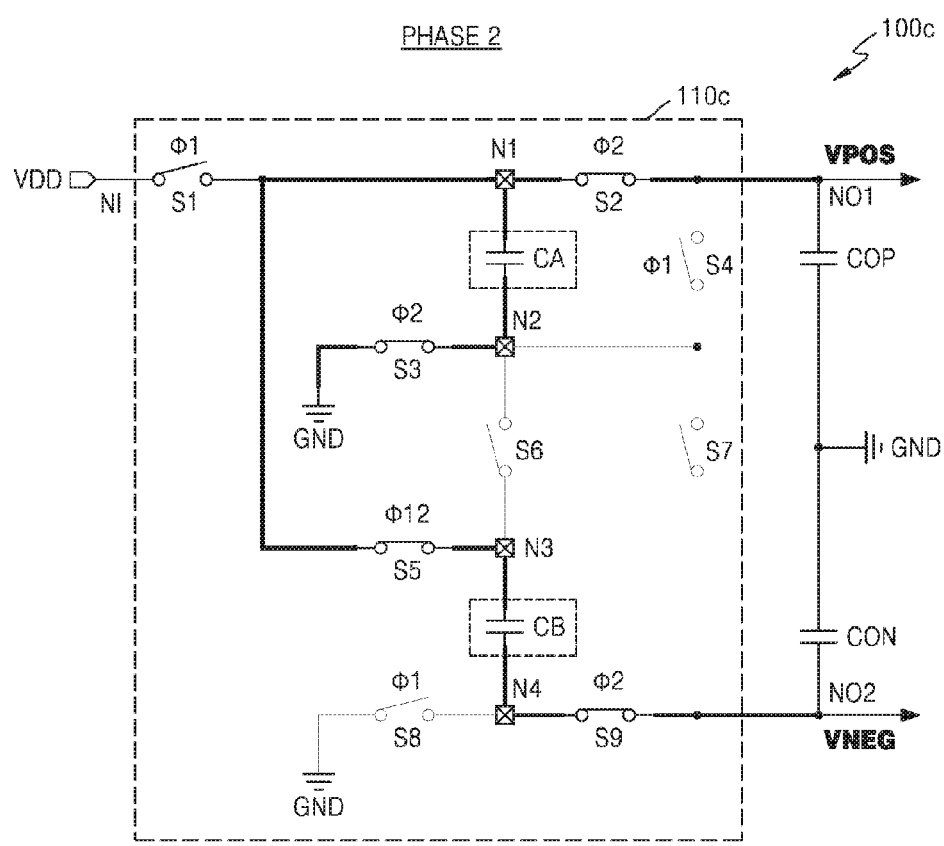
Figure 15B:
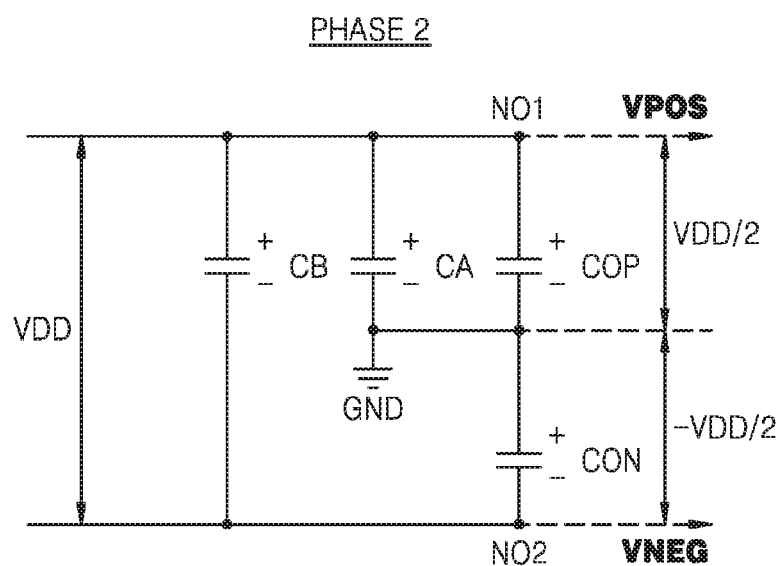

FIG. 15A is a circuit diagram showing the charge pump circuit 100c operating in the second phase of the third charge pump mode, according to an embodiment of the present disclosure, and FIG. 15B shows an equivalent circuit diagram of FIG. 15A.

Referring to FIGS. 15A and 15B, in the second phase, the second and third switches S2 and S3 are turned on to form current paths for the first flying capacitor CA and the first output capacitor COP. The fifth and ninth switches S5 and S9 are turned on to form a current path for the second flying capacitor CB and the second output capacitor CON. The positive output voltage VPOS corresponding to VDD/2 may be provided at the first output node NO1, and the negative output voltage VNEG corresponding to −VDD/2 may be provided at the second output node NO2.

Figure 16A:
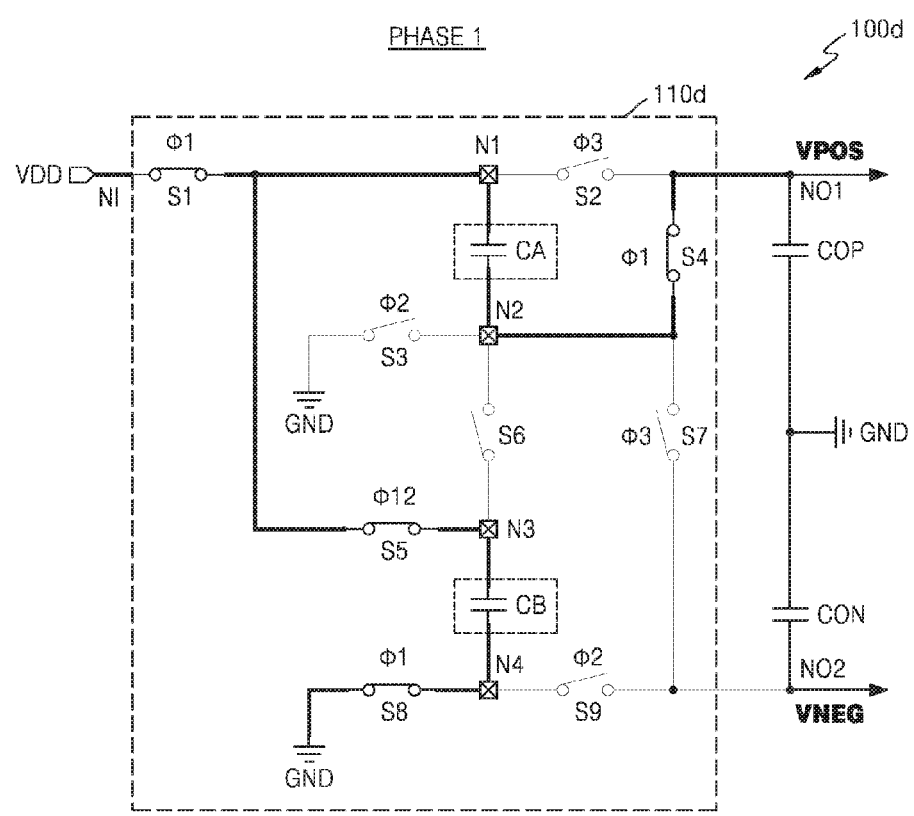
FIGS. 16A to 18B are circuit diagrams showing charge pump circuits providing a fourth charge pump mode, according to an embodiment of the present disclosure.
Figure 16B:
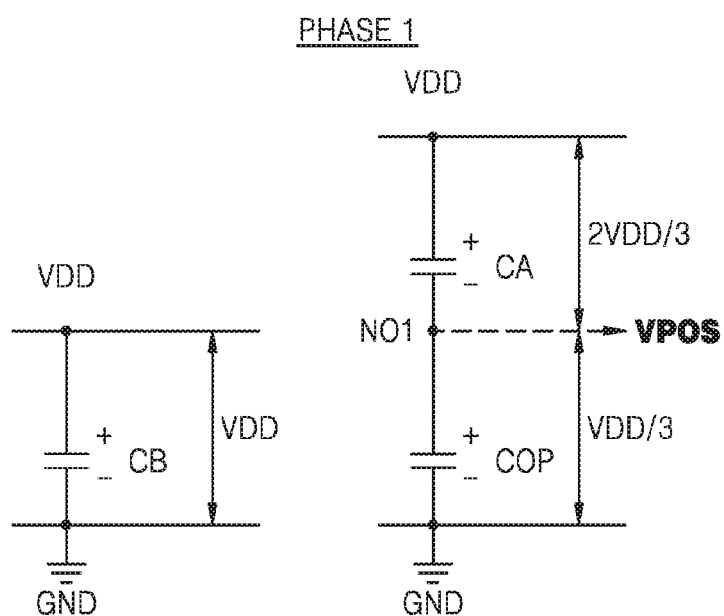

FIG. 16A is a circuit diagram showing a charge pump circuit 100d operating in the first phase of the fourth charge pump mode, according to an embodiment of the present disclosure, and FIG. 16B shows an equivalent circuit diagram of FIG. 16A.

Referring to FIGS. 16A and 16B, in the first phase, the first and fourth switches S1 and S4 are turned on to form a current path for the first flying capacitor CA and the first output capacitor COP. The first, fifth, and eighth switches S1, S5, and S8 are turned on to form a current path for the second flying capacitor CB. In the first phase, the first and second flying capacitors CA and CB may be charged by the input voltage VDD to voltage levels corresponding to 2VDD/3 and VDD, respectively. In detail, the second flying capacitor CB may be connected between the input node NI and the ground terminal GND and charged to VDD. Also, the first flying capacitor CA and the first output capacitor COP may be connected in series between the input node NI and the ground terminal GND so that the first flying capacitor CA may be charged to 2VDD/3 and the first output capacitor COP may be charged to VDD/3.

Figure 17A:
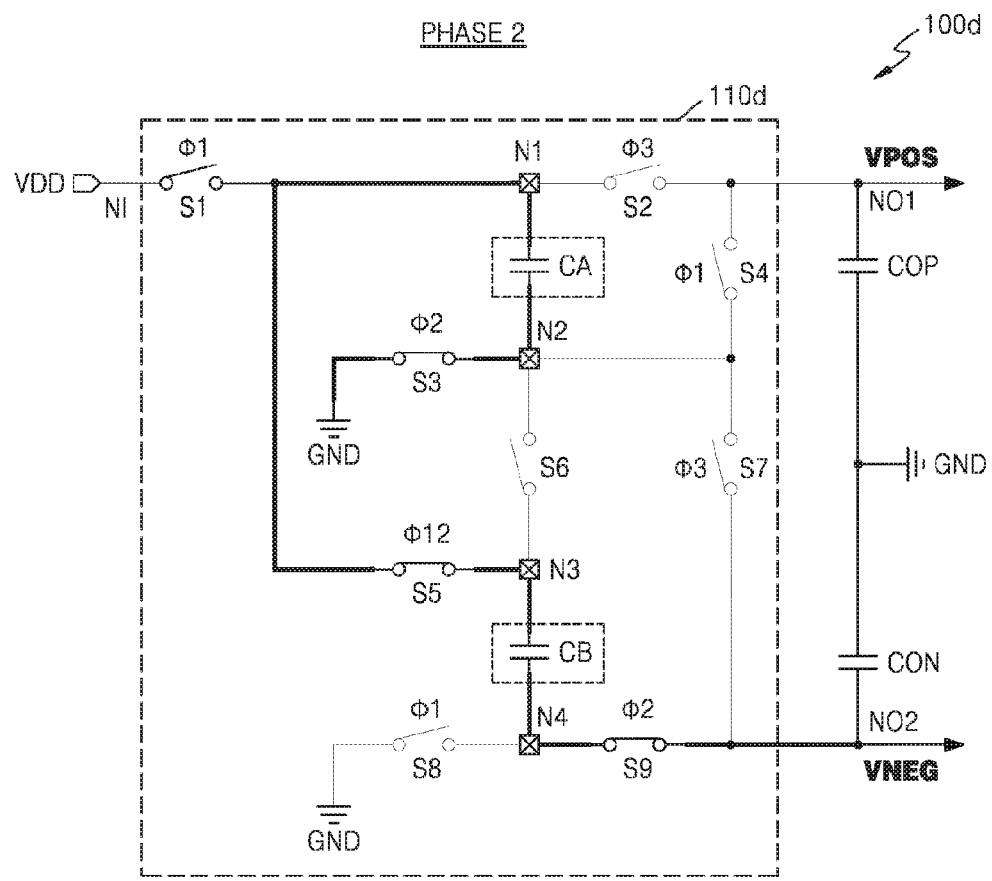
Figure 17B:
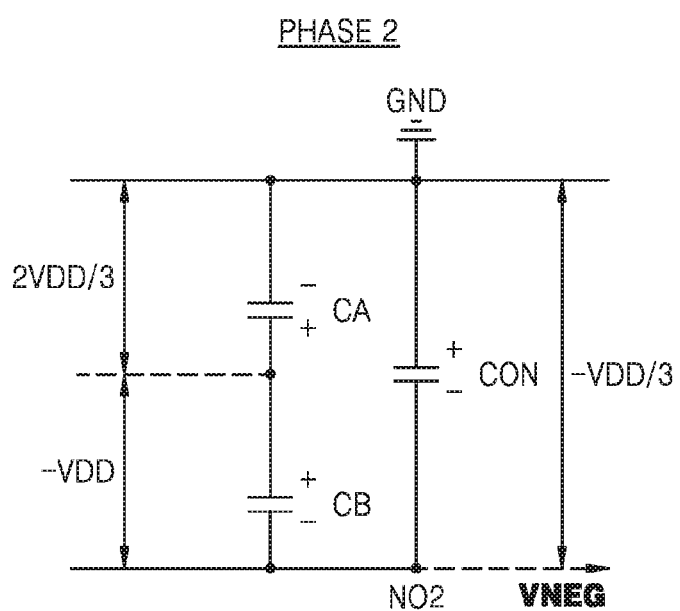

FIG. 17A is a circuit diagram showing the charge pump circuit 100d operating in the second phase of the fourth charge pump mode, according to an embodiment of the present disclosure, and FIG. 17B shows an equivalent circuit diagram of FIG. 17A.

Referring to FIGS. 17A and 17B, in the second phase, the third, fifth, and ninth switches S3, S5, and S9 are turned on to form current paths for the first and second flying capacitors CA and CB and the second output capacitor CON. The negative output voltage VNEG corresponding to −VDD/3 may be provided at the second output node NO2.

Figure 18A:
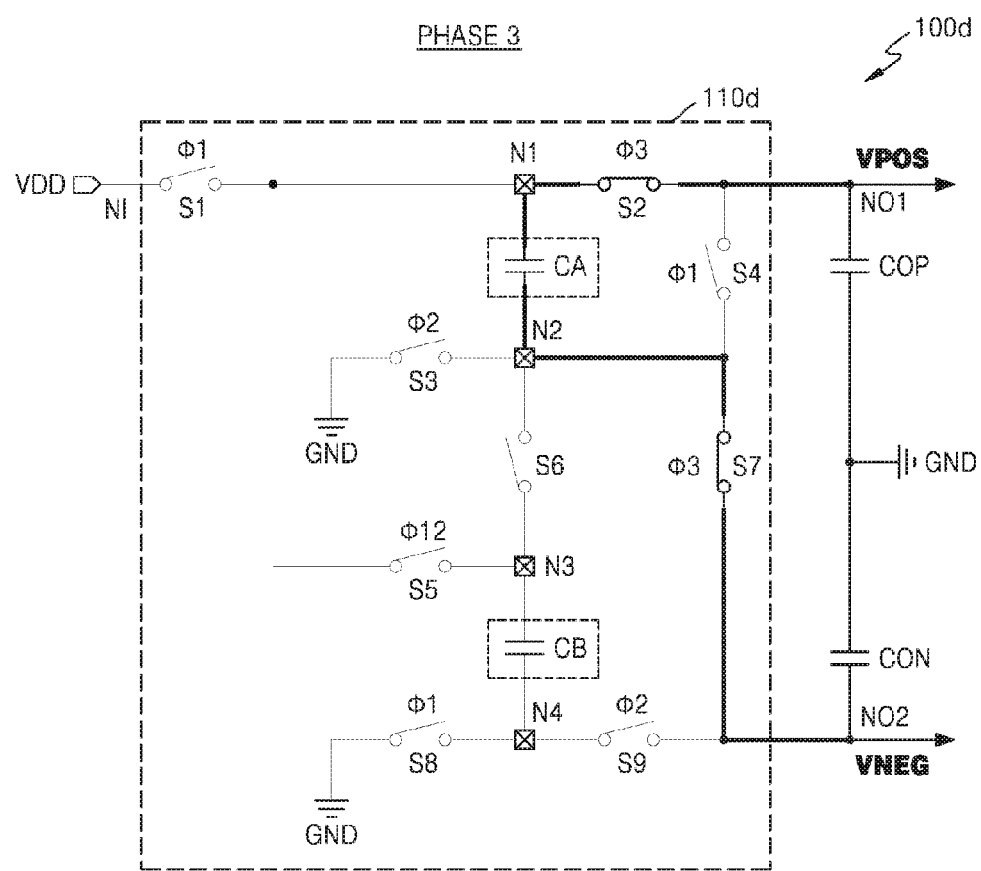
Figure 18B:
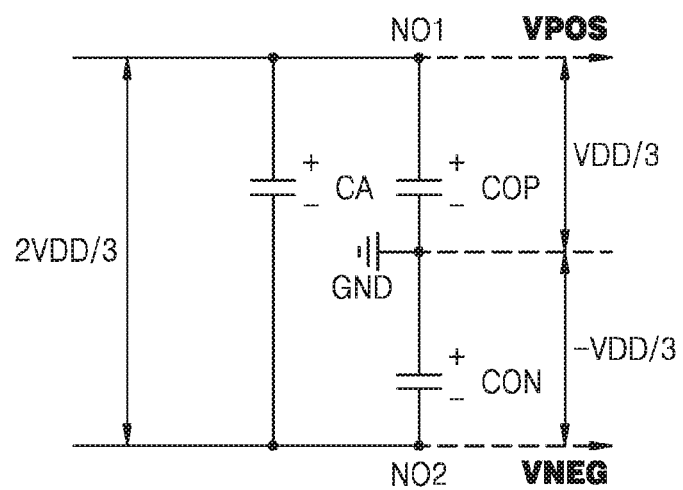

FIG. 18A is a circuit diagram showing the charge pump circuit 100d operating in the third phase of the fourth charge pump mode, according to an embodiment of the present disclosure, and FIG. 18B shows an equivalent circuit diagram of FIG. 18A.

Referring to FIGS. 18A and 18B, in the third phase, the second and seventh switches S2 and S7 are turned on to form a current path for the first flying capacitor CA and the first and second output capacitors COP and CON. The positive output voltage VPOS corresponding to VDD/3 may be provided at the first output node NO1, and the negative output voltage VNEG corresponding to −VDD/3 may be provided at the second output node NO2.

Figure 19:
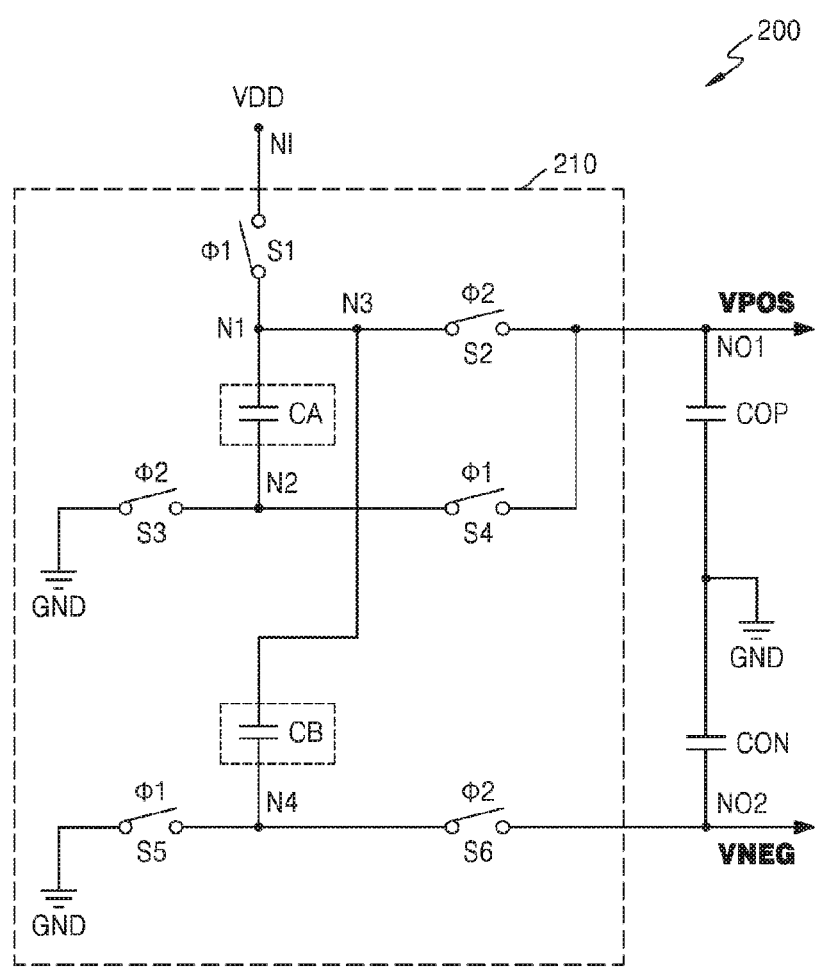
FIG. 19 is a circuit diagram showing a bipolar output charge pump circuit, according to an embodiment of the present disclosure.

FIG. 19 is a circuit diagram showing a bipolar output charge pump circuit 200, according to an embodiment of the present disclosure.

Referring to FIG. 19, the bipolar output charge pump circuit 200 may generate a positive output voltage VPOS and a negative output voltage VNEG corresponding to ±VDD/2 from an input voltage VDD. In detail, the bipolar output charge pump circuit 200 may include first and second flying capacitors CA and CB, first and second output capacitors COP and CON, and a switch network 210. The switch network 210 may include first to sixth switches S1 to S6.

The first switch S1 may be disposed between an input node NI and a first node N1, and may connect the input node NI to the first node N1. The second switch S2 may be disposed between the first node N1 and a first output node NO1, and may connect the first node N1 to the first output node NO1. The third switch S3 may be disposed between a second node N2 and a ground terminal GND, and may connect the second node N2 to the ground terminal GND. The fourth switch S4 may be disposed between the second node N2 and the first output node NO1, and may connect the second node N2 to the first output node NO1. The fifth switch S5 may be disposed between a fourth node N4 and the ground terminal GND, and may connect the fourth node N4 to the ground terminal GND. The sixth switch S6 may be disposed between the fourth node N4 and a second output node NO2, and may connect the fourth node N4 to the second output node NO2.

The bipolar output charge pump circuit 200 may alternately repeat a charged state, that is, a first phase, and a discharged state, that is, a second phase. Accordingly, the positive output voltage VPOS and the negative output voltage VNEG generated at the first and second output nodes NO1 and NO2 may converge at ±VDD/2. Connections in the switch network 210 may be changed according to the first and second phases. In the first phase, the first, fourth, and fifth switches S1, S4, and S5 may be turned on. In the second phase, the second, third, and sixth switches S2, S3, and S6 may be turned on. This will be described in detail with reference to FIGS. 20A and 20B.

Figure 20A:
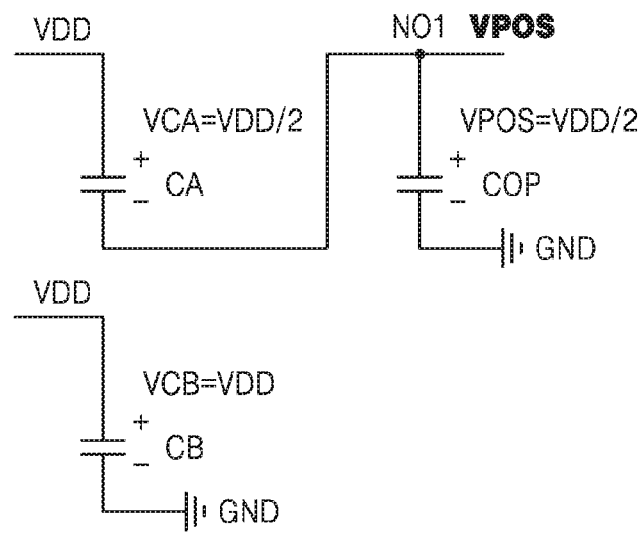
FIGS. 20A and 20B respectively show equivalent circuit diagrams of first and second phases of the charge pump circuit of FIG. 19.
Figure 20B:
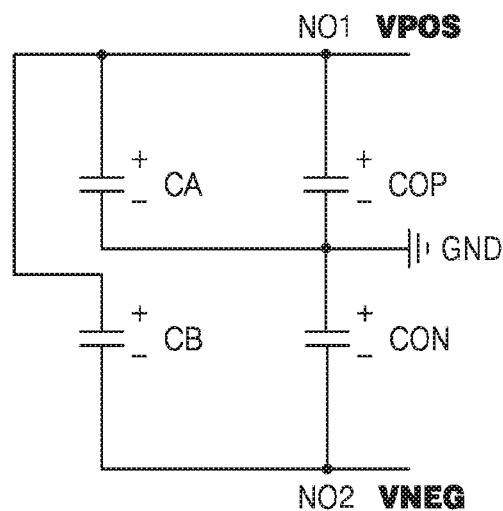

FIGS. 20A and 20B show respectively equivalent circuit diagrams of the first and second phases of the bipolar output charge pump circuit 200 of FIG. 19.

Referring to FIG. 20A, in the first phase, current paths may be formed by the first and fourth switches S1 and S4. Accordingly, the first flying capacitor CA and the first output capacitor COP may be connected in series between the input node NI and the ground terminal GND. Each of the first flying capacitor CA and the first output capacitor COP may be charged to VDD/2 by the input voltage VDD. Also, in the first phase, a current path may be formed by the first and fifth switches S1 and S5. Accordingly, the second flying capacitor CB may be connected between the input node NI and the ground terminal GND. The second flying capacitor CB may be charged to VDD by the input voltage VDD.

Referring to FIG. 20B, in the second phase, the first flying capacitor CA may be separated from the input node NI when the first switch S1 is turned off, and the first flying capacitor CA may be connected to the first output node NO1 when the second switch S2 is turned on. At this time, both-end voltages of the first flying capacitor CA and both-end voltages of the first output capacitor COP are VDD/2, and thus the positive output voltage VPOS corresponding to VDD/2 may be provided at the first output node NO1.

Also, in the second phase, when the first and fifth switches S1 and S5 are turned off, the second flying capacitor CB may be separated from the input node NI and the ground terminal GND. When the second and sixth switches S2 and S6 are turned on, the second flying capacitor CB may be connected to the first and second output nodes NO1 and NO2. At this time, a voltage level of the first output node NO1 is VDD/2, and both-end voltages of the second flying capacitor CB are VDD. Therefore, the negative output voltage VNEG corresponding to −VDD/2 may be generated at the second output node NO2.

Figure 21:
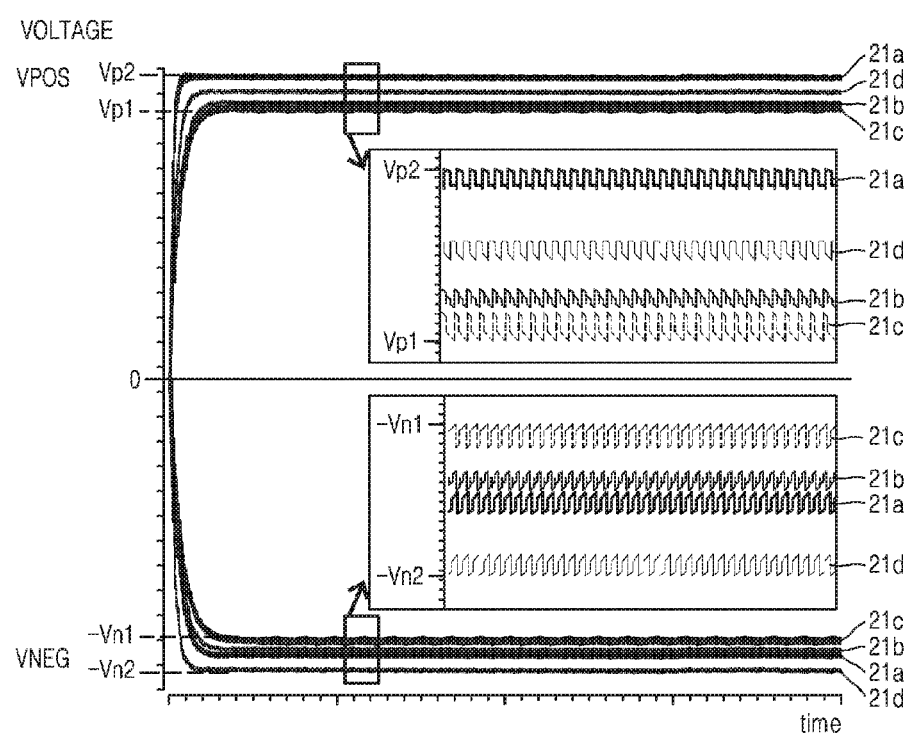
FIG. 21 shows simulation results of an output of the charge pump circuit of FIG. 19.

FIG. 21 shows simulation results of an output of the charge pump circuit 200 of FIG. 19.

Referring to FIG. 21, the horizontal axis denotes time, and the vertical axis denotes voltage. Waveforms 21a to 21d denote outputs of first to fourth charge pumps CP1a to CP4a. The first to fourth charge pumps CP1a to CP4a are "divide-by-2 charge pumps" that each include two flying capacitors and provide ±VDD/2. In detail, the first charge pump CP1a corresponds to an embodiment of the present disclosure, and may be, for example, the charge pump circuit 200 of FIG. 19. The second to fourth charge pumps CP2a to CP4a correspond to comparative examples of the present disclosure and include more switches than the charge pump circuit 200.

The first charge pump CP1a includes six switches, the second charge pump CP2a includes nine switches, the third charge pump CP3a includes seven switches, and the fourth charge pump CP4a includes eight switches. When the first to fourth charge pumps CP1a to CP4a are driven under the same conditions, efficiency of the first to fourth charge pumps CP1a to CP4a is shown in Table 1 below. The same conditions may include input voltages applied to the respective charge pumps, resistances of loads connected to the respective charge pump circuits, resistances of respective switches in an on-state, and operating frequencies of the respective switches.

TABLE 1

| Parameter | CP1a | CP2a | CP3a | CP4a |
|---|---|---|---|---|
| Number of switches | 6 | 9 | 7 | 8 |
| Efficiency | 93% | 87% | 84% | 93% |

As shown in Table 1, the first and fourth charge pumps CP1a and CP4a show the highest efficiency. Here, the first charge pump CP1a has fewer switches than the fourth charge pump CP4a, and thus may have a lower output impedance. Therefore, when a "divide-by-2 charge pump" is implemented using the first charge pump CP1a, according to an embodiment of the present disclosure, few switches are included therein. Accordingly, a chip size may be reduced with a reduction in an implementation area, and performance may be improved with a reduction in the output impedance.

Figure 22:
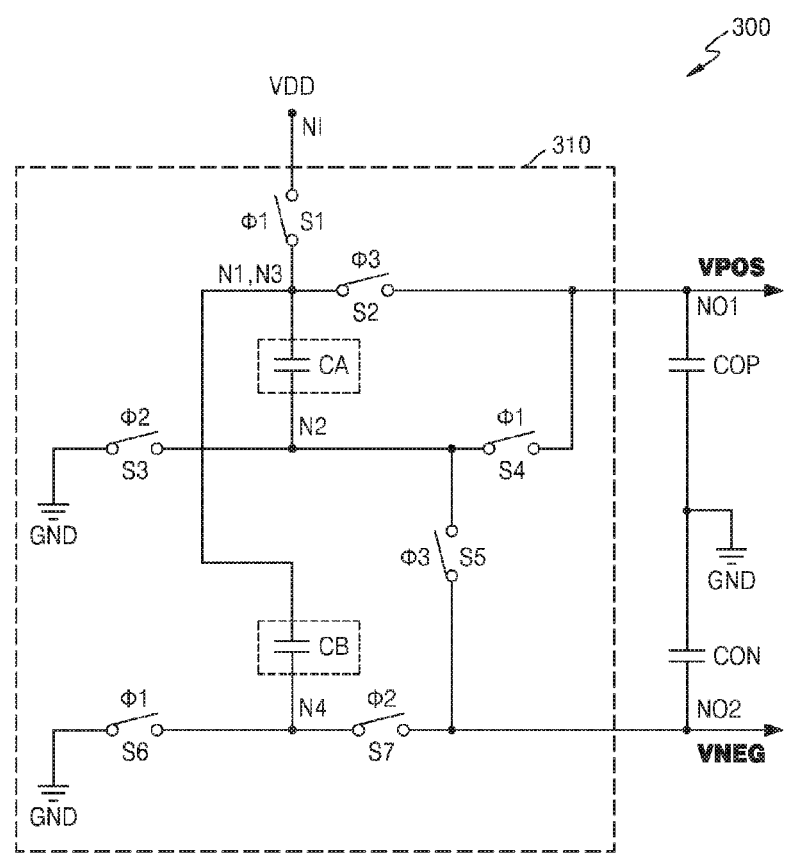
FIG. 22 is a circuit diagram showing a bipolar output charge pump circuit, according to an embodiment of the present disclosure.

FIG. 22 is a circuit diagram showing a bipolar output charge pump circuit 300, according to an embodiment of the present disclosure.

Referring to FIG. 22, the bipolar output charge pump circuit 300 may generate a positive output voltage VPOS and a negative output voltage VNEG corresponding to ±VDD/3 from an input voltage VDD. In detail, the bipolar output charge pump circuit 300 may include first and second flying capacitors CA and CB, first and second output capacitors COP and CON, and a switch network 310. The switch network 310 may include first to seventh switches S1 to S7.

The first switch S1 may be disposed between an input node NI and a first node N1, and may connect the input node NI and the first node N1. The second switch S2 may be disposed between the first node N1 and a first output node NO1, and may connect the first node N1 to the first output node NO1. The third switch S3 may be disposed between a second node N2 and a ground terminal GND, and may connect the second node N2 to the ground terminal GND. The fourth switch S4 may be disposed between the second node N2 and the first output node NO1, and may connect the second node N2 to the first output node NO1. The fifth switch S5 may be disposed between the second node N2 and a second output node NO2, and may connect the second node N2 to the second output node NO2. The sixth switch S6 may be disposed between a fourth node N4 and the ground terminal GND, and may connect the fourth node N4 to the ground terminal GND. The seventh switch S7 may be disposed between the fourth node N4 and the second output node NO2, and may connect the fourth node N4 to the second output node NO2.

The bipolar output charge pump circuit 300 may alternately repeat first to third phases. The first phase corresponds to the charged state, and the second and third states correspond to the discharged state. Accordingly, the positive output voltage VPOS and the negative output voltage VNEG generated at the first and second output nodes NO1 and NO2 may converge at ±VDD/3. Connections in the switch network 310 may be changed according to the first to third phases. The first, fourth, and sixth switches S1, S4, and S6 may be turned on in the first phase. The third and seventh switches S3 and S7 may be turned on in the second phase. The second and fifth switches S2 and S5 may be turned on in the third phase. This will be described in detail with reference to FIGS. 23A to 23C.

Figure 23A:
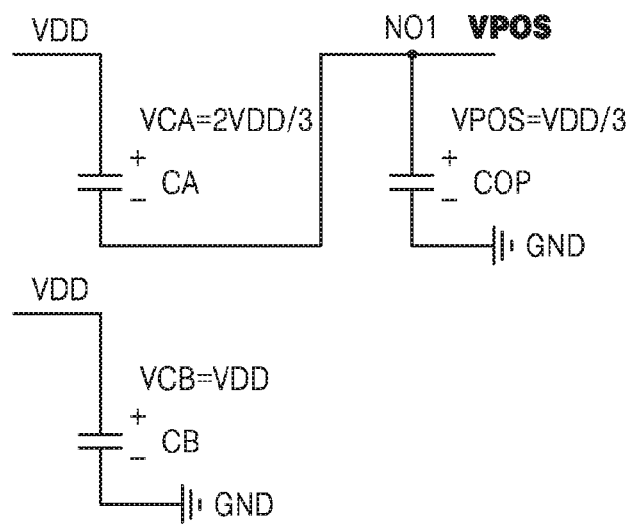
FIGS. 23A to 23C respectively show equivalent circuit diagrams of first to third phases of the charge pump circuit of FIG. 22.
Figure 23B:
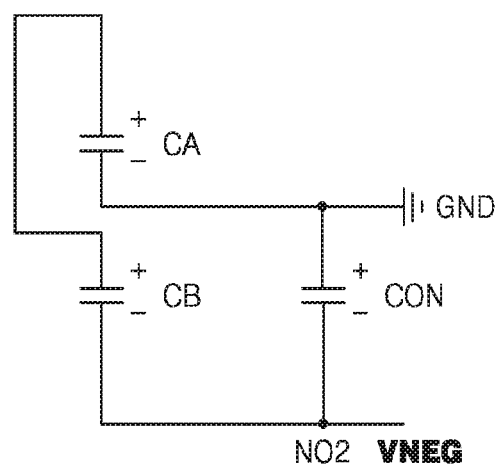
Figure 23C:
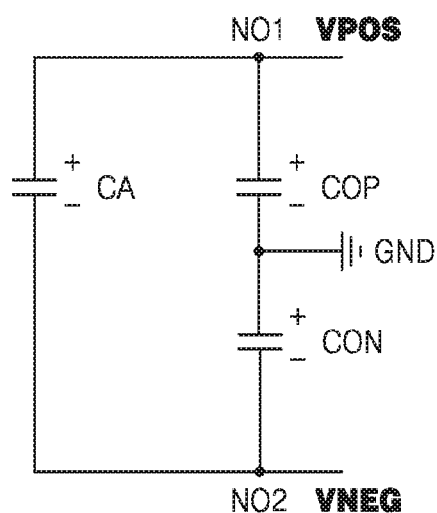

FIGS. 23A and 23C respectively show equivalent circuit diagrams of the first to third phases of the charge pump circuit 300 of FIG. 22.

Referring to FIG. 23A, in the first phase, current paths may be formed by the first and fourth switches S1 and S4.

Accordingly, the first flying capacitor CA and the first output capacitor COP may be connected in series between the input node NI and the ground terminal GND. The first flying capacitor CA and the first output capacitor COP may be respectively charged to 2VDD/3 and VDD/3 by the input voltage VDD. Also, in the first phase, a current path may be formed by the first and sixth switches S1 and S6. Accordingly, the second flying capacitor CB may be connected between the input node NI and the ground terminal GND. The second flying capacitor CB may be charged to VDD by the input voltage VDD.

Referring to FIG. 23B, in the second phase, the first flying capacitor CA may be separated from the input node NI and the first output node NO1 when the first and second switches S1 and S2 are turned off. Also, in the second phase, the second flying capacitor CB may be separated from the input node NI and the ground terminal GND when the first and sixth switches S1 and S6 are turned off, and may be connected between the first node N1 and the second output node NO2 when the third and seventh switches S3 and S7 are turned on. At this time, both-end voltages of the first flying capacitor CA are 2VDD/3, and both-end voltages of the second flying capacitor CB are VDD. Therefore, the negative output voltage VNEG corresponding to −VDD/3 may be provided at the second output node NO2.

Referring to FIG. 23C, in the third phase, the first flying capacitor CA may be separated from the input node NI when the first switch S1 is turned off, and may be connected to the first and second output nodes NO1 and NO2 when the second and fifth switches S2 and S5 are turned on. Also, in the third phase, the second flying capacitor CB may be separated from the input node NI, the ground terminal GND, and the second output node NO2 when the first, sixth, and seventh switches S1, S6, and S7 are turned off. At this time, both-end voltages of the first output capacitor COP are VDD/3 and both-end voltages of the first flying capacitor CA are 2VDD/3. Therefore, the positive output voltage VPOS corresponding to VDD/3 may be provided at the first output node NO1, and the negative output voltage VNEG corresponding to −VDD/3 may be provided at the second output node NO2.

Figure 24:
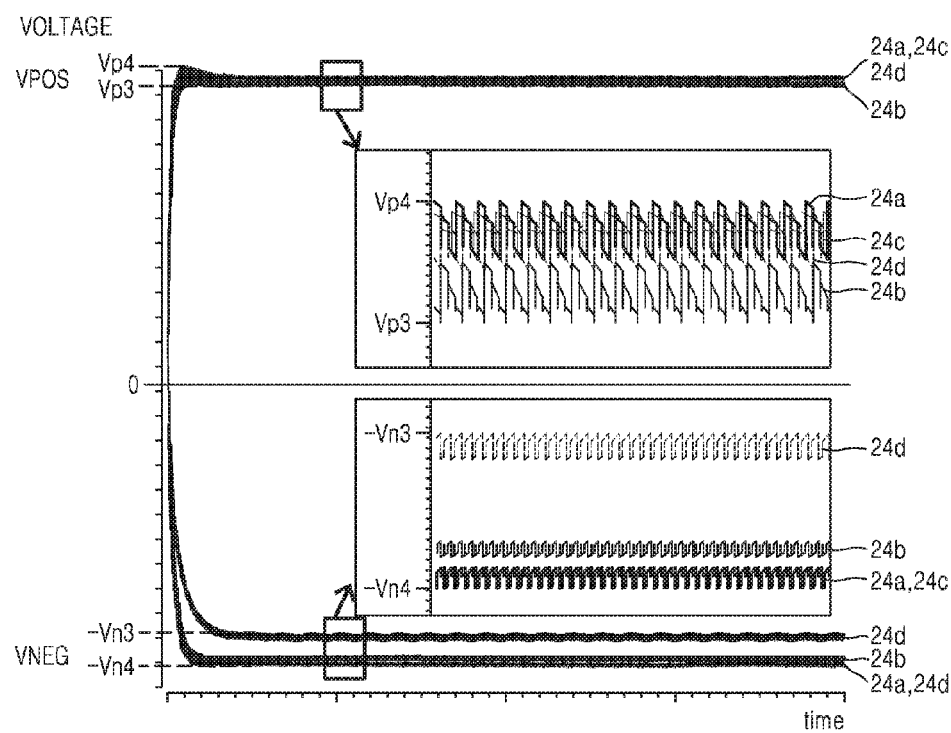
FIG. 24 shows simulation results of an output of the charge pump circuit of FIG. 22.

FIG. 24 shows simulation results of an output of the charge pump circuit 300 of FIG. 22.

Referring to FIG. 24, the horizontal axis denotes time, and the vertical axis denotes voltage. Waveforms 24a to 24d denote outputs of first to fourth charge pumps CP1b to CP4b. The first to fourth charge pumps CP1b to CP4b are "divide-by-3 charge pumps" that each include two flying capacitors and provide ±VDD/3. In detail, the first charge pump CP1b corresponds to an embodiment of the present disclosure and may be, for example, the charge pump circuit 300 of FIG. 22. The second to fourth charge pumps CP2b to CP4b correspond to comparative examples of the present disclosure and include more switches than the charge pump circuit 300.

The first charge pump CP1b includes seven switches, the second charge pump CP2b includes ten switches, the third charge pump CP3b includes eighth switches, and the fourth charge pump CP4b includes eight switches. When the first to fourth charge pumps CP1b to CP4b are driven under the same conditions, efficiency of the first to fourth charge pumps CP1b to CP4b is shown in Table 2 below. The same conditions may include input voltages applied to the respective charge pumps, resistances of loads connected to the respective charge pump circuits, resistances of respective switches in the on-state, and operating frequencies of the respective switches.

TABLE 2

| Parameter | CP1b | CP2b | CP3b | CP4b |
|---|---|---|---|---|
| Number of switches | 7 | 10 | 8 | 8 |
| Efficiency | 91% | 88% | 91% | 82% |

As shown in Table 2, the first and third charge pumps CP1b and CP3b show the highest efficiency. Here, the first charge pump CP1b has fewer switches than the third charge pump CP3b, and thus may have a lower output impedance. Therefore, when a "divide-by-3 charge pump" is implemented using the first charge pump CP1b, according to an embodiment of the present disclosure, few switches are included. Accordingly, a chip size may be reduced with a reduction in an implementation area, and performance may be improved with a reduction in the output impedance.

Figure 25:
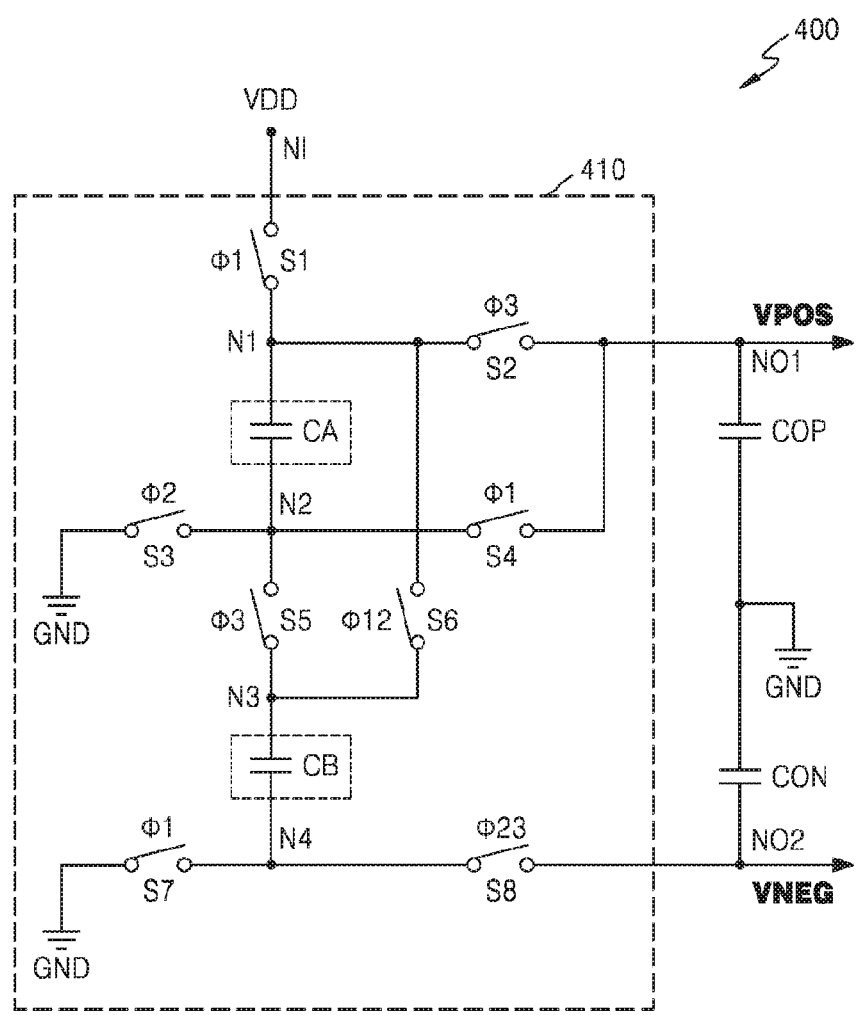
FIG. 25 is a circuit diagram showing a bipolar output charge pump circuit, according to an embodiment of the present disclosure.

FIG. 25 is a circuit diagram showing a bipolar output charge pump circuit 400, according to an embodiment of the present disclosure.

Referring to FIG. 25, the bipolar output charge pump circuit 400 may generate a positive output voltage VPOS and a negative output voltage VNEG corresponding to ±2VDD/3 from an input voltage VDD. In detail, the bipolar output charge pump circuit 400 may include first and second flying capacitors CA and CB, first and second output capacitors COP and CON, and a switch network 410. The switch network 410 may include first to eighth switches S1 to S8.

The first switch S1 may be disposed between an input node NI and a first node N1, and may connect the input node NI to the first node N1. The second switch S2 may be disposed between the first node N1 and a first output node NO1, and may connect the first node N1 to the first output node NO1. The third switch S3 may be disposed between a second node N2 and a ground terminal GND, and may connect the second node N2 to the ground terminal GND. The fourth switch S4 may be disposed between the second node N2 and the first output node NO1, and may connect the second node N2 to the first output node NO1. The fifth switch S5 may be disposed between the second node N2 and a third node N3, and may connect the second node N2 to the third node N3. The sixth switch S6 may be disposed between the first node N1 and the third node N3, and may connect the first node N1 to the third node N3. The seventh switch S7 may be disposed between the fourth node N4 and the ground terminal GND, and may connect the fourth node N4 to the ground terminal GND. The eighth switch S8 may be disposed between the fourth node N4 and a second output node NO2, and may connect the fourth node N4 to the second output node NO2.

The bipolar output charge pump circuit 400 may alternately repeat first to third phases. The first phase corresponds to the charged state, and the second and third states correspond to the discharged state. Accordingly, the positive output voltage VPOS and the negative output voltage VNEG generated at the first and second output nodes NO1 and NO2 may converge at ±2VDD/3. Connections in the switch network 410 may be changed according to the first to third phases. The first, fourth, sixth, and seventh switches S1, S4, S6, and S7 may be turned on in the first phase. The third, sixth, and eighth switches S3, S6, and S8 may be turned on in the second phase. The second, fifth, and eighth switches S2, S5, and S8 may be turned on in the third phase. This will be described in detail with reference to FIGS. 26A to 26C.

Figure 26A:
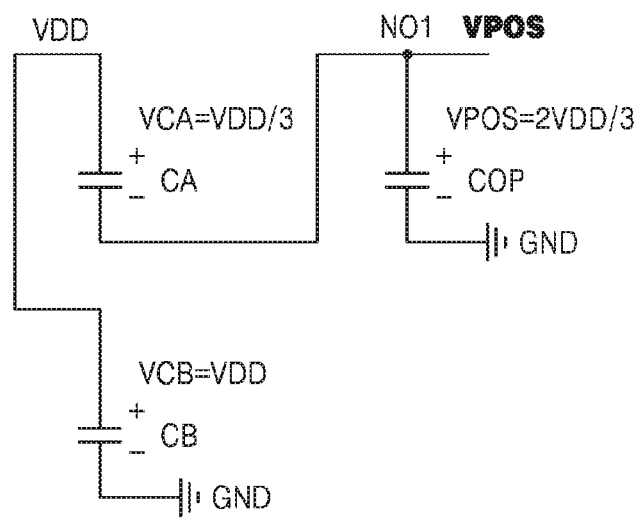
FIGS. 26A to 26C respectively show equivalent circuit diagrams of first to third phases of the charge pump circuit of FIG. 25.
Figure 26B:
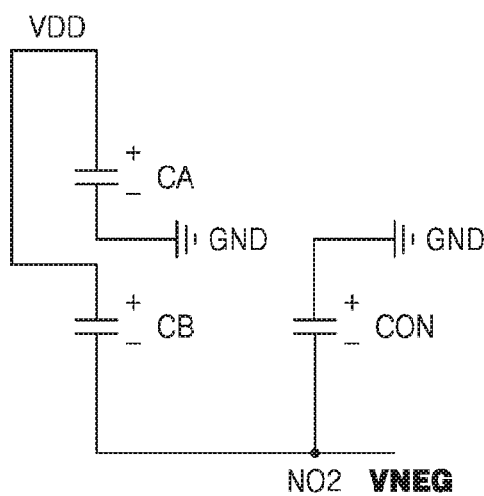
Figure 26C:
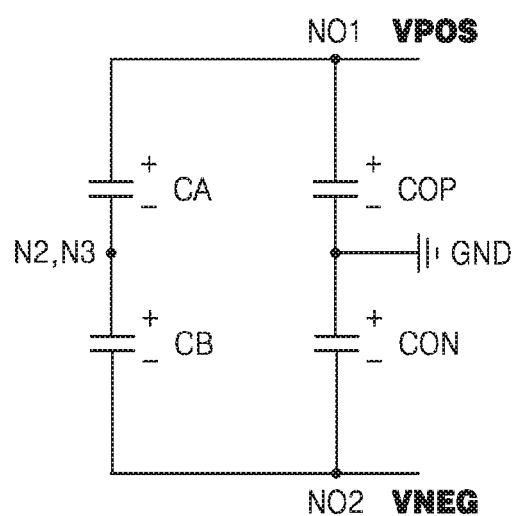

FIGS. 26A and 26C respectively show equivalent circuit diagrams of the first to third phases of the charge pump circuit 400 of FIG. 25.

Referring to FIG. 26A, in the first phase, current paths may be formed by the first and fourth switches S1 and S4. Accordingly, the first flying capacitor CA and the first output capacitor COP may be connected in series between the input node NI and the ground terminal GND. The first flying capacitor CA and the first output capacitor COP may be respectively charged to VDD/3 and 2VDD/3 by the input voltage VDD. Also, in the first phase, a second current path may be formed by the first, sixth, and seventh switches S1, S6, and S7. Accordingly, the second flying capacitor CB may be connected between the input node NI and the ground terminal GND. The second flying capacitor CB may be charged to VDD by the input voltage VDD.

Referring to FIG. 26B, in the second phase, the first flying capacitor CA may be separated from the input node NI and the first output node NO1 when the first and second switches S1 and S2 are turned off. Also, in the second phase, the second flying capacitor CB may be separated from the input node NI and the ground terminal GND when the first and seventh switches S1 and S7 are turned off, and may be connected between the first node N1 and the second output node NO2 when the sixth and eighth switches S6 and S8 are turned on. At this time, both-end voltages of the first flying capacitor CA are VDD/3, and both-end voltages of the second flying capacitor CB are VDD. Therefore, the negative output voltage VNEG corresponding to −2VDD/3 may be provided at the second output node NO2.

Referring to FIG. 26C, in the third phase, the first flying capacitor CA may be separated from the input node NI when the first switch S1 is turned off, and may be connected between the first output nodes NO1 and the third node N3 when the second and fifth switches S2 and S5 are turned on. Also, in the third phase, the second flying capacitor CB may be separated from the input node NI when the first and sixth switches S1 and S6 are turned off, and may be connected between the second node N2 and the second output node NO2 when the fifth and eighth switches S5 and S8 are turned on. At this time, both-end voltages of the first output capacitor COP are 2VDD/3, both-end voltages of the first flying capacitor CA are VDD/3, and both-end voltages of the second flying capacitor CB are VDD. Therefore, the positive output voltage VPOS corresponding to 2VDD/3 may be provided at the first output node NO1, and the negative output voltage VNEG corresponding to −2VDD/3 may be provided at the second output node NO2.

Figure 27:
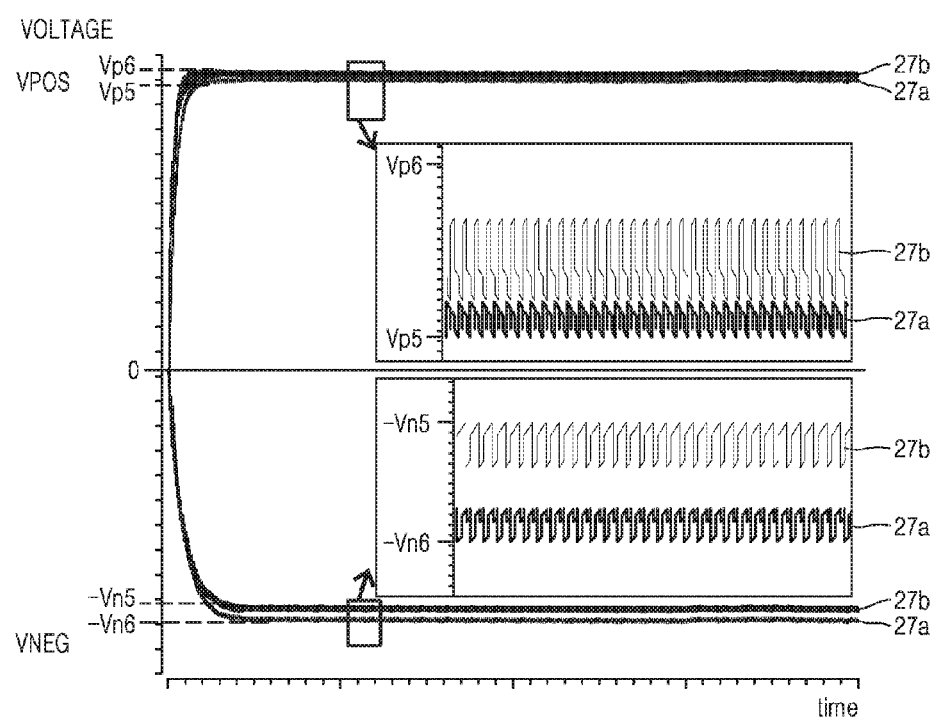
FIG. 27 shows simulation results of an output of the charge pump circuit of FIG. 25.

FIG. 27 shows simulation results of an output of the charge pump circuit 400 of FIG. 25.

Referring to FIG. 27, the horizontal axis denotes time, and the vertical axis denotes voltage. Waveforms 27a and 27b denote outputs of first and second charge pumps CP1c and CP2c. The first and second charge pumps CP1c and CP2c are "divide-by-3/2 charge pumps" that each include two flying capacitors and provide ±2VDD/3. In detail, the first charge pump CP1c corresponds to an embodiment of the present disclosure and may be, for example, the charge pump circuit 400 of FIG. 25. The second charge pump CP2c corresponds to a comparative example of the present disclosure and includes more switches than the charge pump circuit 400.

The first charge pump CP1c includes eight switches, and the second charge pump CP2c includes nine switches. When the first and second charge pumps CP1c and CP2c are driven under the same conditions, efficiency of the first and second charge pumps CP1c and CP2c is shown in Table 3 below. The same conditions may include input voltages applied to the respective charge pumps, resistances of loads connected to the respective charge pump circuits, resistances of respective switches in the on-state, and operating frequencies of the respective switches.

TABLE 3

| Parameter | CP1c | CP2c |
|---|---|---|
| Number of switches | 8 | 9 |
| Efficiency | 85% | 84% |

As shown in Table 3, the first charge pump CP1c shows higher efficiency than the second charge pump CP2c. Also, the first charge pump CP1c has fewer switches than the second charge pump CP2c, and thus may have a lower output impedance. Therefore, when a "divide-by-3/2 charge pump" is implemented using the first charge pump CP1c, according to an embodiment of the present disclosure, few switches are included. Accordingly, a chip size may be reduced with a reduction in an implementation area, and performance may be improved with a reduction in the output impedance.

Figure 28:
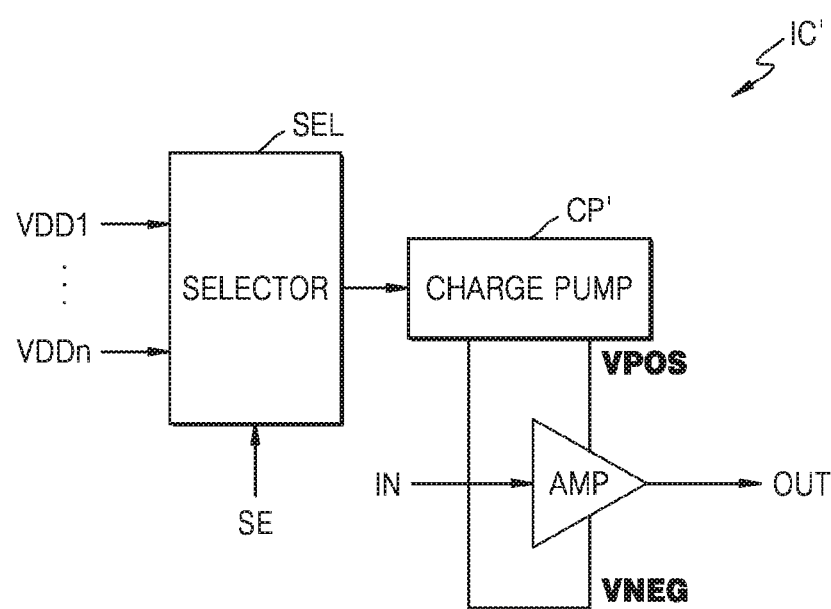
FIG. 28 shows an integrated circuit, according to an embodiment of the present disclosure.

FIG. 28 shows an integrated circuit IC', according to an embodiment of the present disclosure.

Referring to FIG. 28, the integrated circuit IC' may include a selector SEL, a charge pump CP', and an amplifier AMP. In an embodiment, the selector SEL, the charge pump CP', and the amplifier AMP may be implemented as a single chip. In an embodiment, the selector SEL, the charge pump CP', and the amplifier AMP may be implemented as a single package. In this case, some elements of the charge pump CP', the selector SEL, and the amplifier AMP may be implemented as a chip, and other elements of the charge pump CP' may be disposed outside the chip.

The integrated circuit IC' may further include the selector SEL in comparison to the integrated circuit IC of FIG. 1. The selector SEL may receive input voltages VDD1 to VDDn and provide one of the input voltages VDD1 to VDDn selected according to a selection signal SE received from the outside thereof to the charge pump CP'. Since the input voltage VDD input to the charge pump CP' is determined to be one of the input voltages VDD1 to VDDn, the charge pump CP' may generate more multi-output levels than the charge pump CP of FIG. 1. The charge pump CP' and the amplifier AMP may be implemented to be substantially the same as the charge pump CP and the amplifier AMP of FIG. 1, and duplicate descriptions will be omitted.

Figure 29:
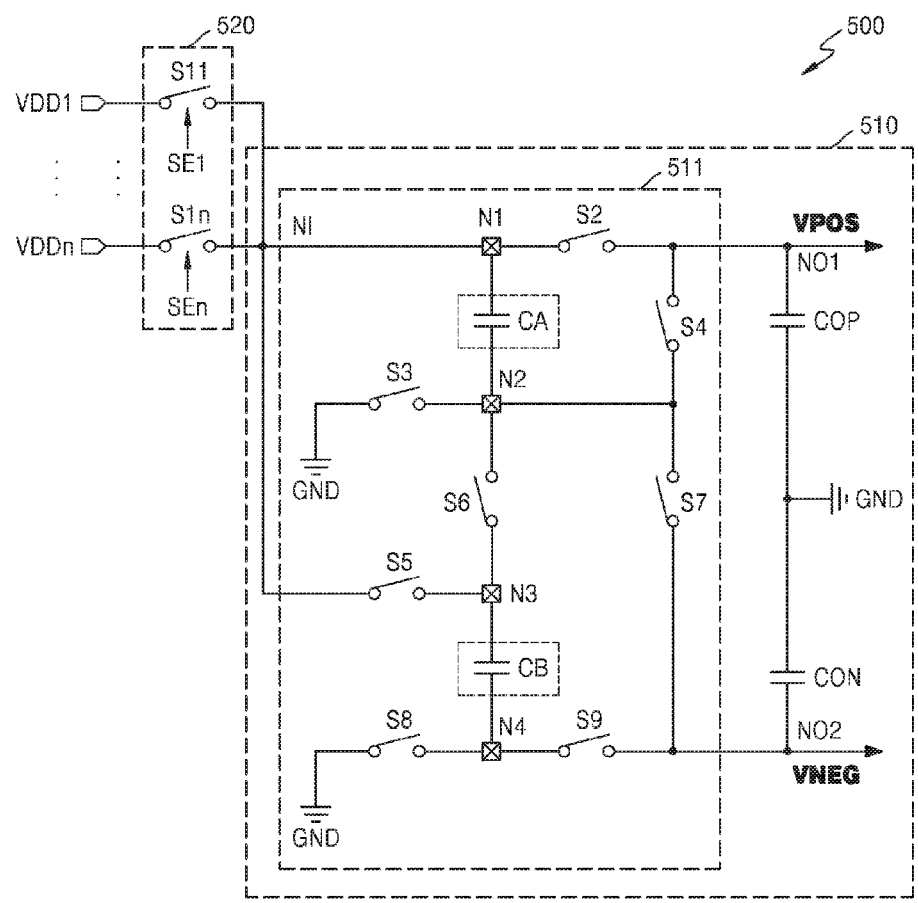
FIG. 29 is a circuit diagram showing an example of the integrated circuit of FIG. 28.

FIG. 29 is a circuit diagram showing an integrated circuit 500 which is an example of the integrated circuit IC' of FIG. 28.

Referring to FIG. 29, the integrated circuit 500 may include a charge pump circuit 510 and a selector 520, and the charge pump circuit 510 may include first and second flying capacitors CA and CB, first and second output capacitors COP and CON, and a switch network 511. The charge pump circuit 510 may be implemented to be substantially the same as the charge pump circuit 100 of FIG. 6, and the above descriptions of FIGS. 6 to 18B may also be applied to the present embodiment. The charge pump circuit 510 may have the same configuration as the charge pump circuit 100 of FIG. 6 except for the first switch S1.

The selector 520 may include multiple switches S11 to S1n. The switches S11 to S1n may be respectively connected to input voltages VDD1 to VDDn, and respectively driven by selection signals SE1 to SEn. For example, when the selector 520 provides the first input voltage VDD1 to the input node NI, multiple possible output voltages generated by the charge pump circuit 510 may be ±VDD1, ±2VDD1/3, ±VDD1/2, and/or ±VDD1/3. For example, when the selector 520 provides the $N^{th}$ input voltage VDDn to the input node NI, the multiple possible output voltages generated by the charge pump circuit 510 may be ±VDDn, ±2VDDn/3, ±VDDn/2, and/or ±VDDn/3.

Figure 30:
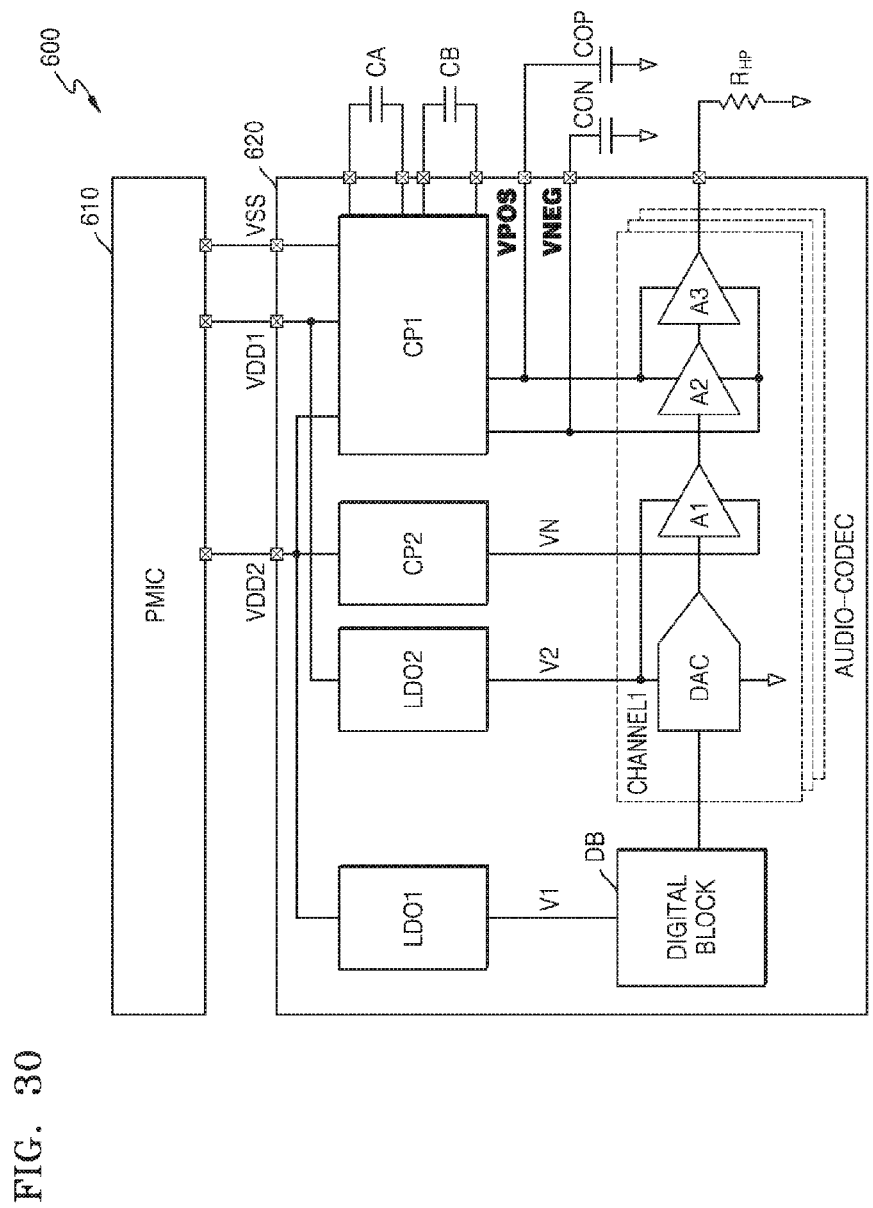
FIG. 30 is a block diagram showing an electronic device, according to an embodiment of the present disclosure.

FIG. 30 is a block diagram showing an electronic device 600, according to an embodiment of the present disclosure.

Referring to FIG. 30, the electronic device 600 may include a power management integrated circuit (PMIC) 610 and an audio codec 620. The audio codec 620 may include first and second charge pumps CP1 and CP2, first and second low drop out (LDO) regulators LDO1 and LDO2, a digital block DB, a digital-analog converter DAC, and first to third amplifiers A1 to A3. Each of the PMIC 610 and the audio codec 620 may be implemented as a single chip.

The PMIC 610 may receive power from the outside thereof and provide the first and second input voltages VDD1 and VDD2 and a ground voltage VSS to the audio codec 620. The first input voltage VDD1 may be higher than the second input voltage VDD2. For example, the first input voltage VDD1 may be 1.95 V, and the second input voltage VDD2 may be 1.35 V. In detail, the PMIC 610 may provide the first and second input voltages VDD1 and VDD2 to the first charge pump CP1. Also, the PMIC 610 may provide the second input voltage VDD2 to the first LDO regulator LDO1, the first input voltage VDD1 to the second LDO regulator LDO2, and the second input voltage VDD2 to the second charge pump CP2.

The first charge pump CP1 may be a bipolar output charge pump that generates a positive output voltage VPOS and a negative output voltage VNEG. Here, one of multiple possible output levels may be selected as a magnitude of the positive output voltage VPOS and the negative output voltage VNEG. Accordingly, the first charge pump CP1 may be referred to as a "multi-level charge pump." The second charge pump CP2 may be a negative output charge pump that generates a negative voltage VN. The first LDO regulator LDO1 may generate a first voltage V1 from the second input voltage VDD2, and the second LDO regulator LDO2 may generate a second voltage V2 from the first input voltage VDD1.

The digital block DB may receive the first voltage V1 and generate a digital audio signal. The digital-analog converter DAC may receive the second voltage V2 and convert the digital audio signal into an analog audio signal. A first amplifier A1 may receive the second voltage V2 and the negative voltage VN and amplify the analog audio signal. The second amplifier A2 may receive the positive output voltage VPOS and the negative output voltage VNEG and amplify an output of the first amplifier A1. The third amplifier A3 may receive the positive output voltage VPOS and the negative output voltage VNEG and amplify an output of the second amplifier A2. An output terminal of the third amplifier A3 may be connected to a load resistance $R_{HP}$.

In an embodiment, the first charge pump CP1 may correspond to the charge pump CP of FIG. 1. In detail, the first charge pump CP1 may be implemented as the integrated circuit 100 shown as an example in FIGS. 4 and 6, the charge pump circuit 200 of FIG. 19, the charge pump circuit 300 of FIG. 22, and the charge pump circuit 400 of FIG. 25. In an embodiment, the first charge pump CP1 may correspond to the charge pump CP' of FIG. 28, and in detail, may be implemented as the integrated circuit 500 of FIG. 29. Meanwhile, the second and third amplifiers A2 and A3 may correspond to the amplifier AMP of FIG. 1 or the amplifier AMP of FIG. 28, and the load resistance $R_{HP}$ may correspond to a headphone.

Figure 31:
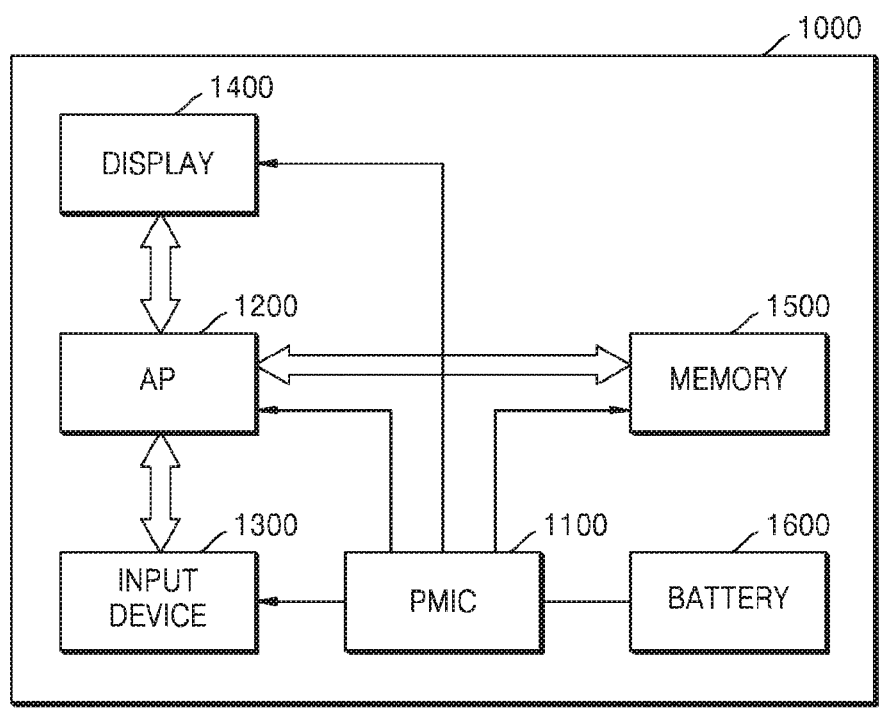
FIG. 31 is a block diagram showing a mobile device, according to an embodiment of the present disclosure.

FIG. 31 is a block diagram showing a mobile device 1000, according to an embodiment of the present disclosure.

Referring to FIG. 31, the mobile device 1000 may include a PMIC 1100, an application processor (AP) 1200, an input device 1300, a display 1400, a memory 1500, and a battery 1600. For example, the electronic device 1000 may be a smart phone, a personal computer (PC), a tablet PC, a netbook, an e-book reader, a personal digital assistant (PDA), a portable media player (PMP), an MP3 player, and so on. Also, the electronic device 1000 may be a wearable device, such as an electronic bracelet, an electronic necklace, and so on.

The PMIC 1100 may receive the power from the battery 1600 and manage the AP 1200, the input device 1300, the display 1400, or the memory 1500. The AP 1200 controls the overall operation of the electronic device 1000. In detail, the AP 1200 may display data stored in the memory 1500 through the display 1400 according to an input signal generated by the input device 1300. For example, the input device 1300 may be implemented as a pointing device, such as a touch pad or a mouse, a keypad, or a keyboard. The AP 1200 or the memory 1500 may include a charge pump circuit according to the various embodiments of the present disclosure described above.

While the concepts described herein have been particularly shown and described with reference to embodiments thereof, it will be understood that various changes in form and details may be made therein without departing from the spirit and scope of the following claims.

What is claimed is:

1. A reconfigurable bipolar output charge pump, comprising:
   an input terminal configured to receive an input voltage;
   first and second terminals configured to be connected to a first flying capacitor;
   third and fourth terminals configured to be connected to a second flying capacitor;
   first and second output terminals configured to be respectively connected to first and second output capacitors and respectively provide a positive output voltage and a negative output voltage;
   a switch network that includes a plurality of switches configured to variably connect the input terminal, the first to fourth terminals, and the first and second output terminals to each other in response to a plurality of switch control signals, and to provide one of a plurality of charge pump modes;
   a controller configured to generate the plurality of switch control signals in response to a mode control signal indicating one of the plurality of charge pump modes so that a magnitude of the positive output voltage and the negative output voltage becomes one of a plurality of predefined voltage levels; and
   a level detector configured to detect the positive output voltage and the negative output voltage and generate a switching frequency control signal for controlling a switching frequency.

2. The reconfigurable bipolar output charge pump of claim 1, wherein the plurality of charge pump modes include:
   a first charge pump mode in which the magnitude of the positive output voltage and the negative output voltage corresponds to the input voltage;

a second charge pump mode in which the magnitude of the positive output voltage and the negative output voltage corresponds to 1/m of the input voltage; and a third charge pump mode in which the magnitude of the positive output voltage and the negative output voltage corresponds to 1/n of the input voltage, and wherein m and n are different positive integers equal to or greater than 2.

3. The reconfigurable bipolar output charge pump of claim 1, wherein the plurality of charge pump modes include:

a first charge pump mode in which the magnitude of the positive output voltage and the negative output voltage corresponds to the input voltage;

a second charge pump mode in which the magnitude of the positive output voltage and the negative output voltage corresponds to 1/m of the input voltage; and a third charge pump mode in which the magnitude of the positive output voltage and the negative output voltage corresponds to n/m of the input voltage, and wherein m and n are different positive integers equal to or greater than 2.

4. The reconfigurable bipolar output charge pump of claim 1, wherein the plurality of charge pump modes include at least two of:

a first charge pump mode in which the magnitude of the positive output voltage and the negative output voltage corresponds to the input voltage;

a second charge pump mode in which the magnitude of the positive output voltage and the negative output voltage corresponds to ⅔ of the input voltage;

a third charge pump mode in which the magnitude of the positive output voltage and the negative output voltage corresponds to ½ of the input voltage; and a fourth charge pump mode in which the magnitude of the positive output voltage and the negative output voltage corresponds to ⅓ of the input voltage.

5. The reconfigurable bipolar output charge pump of claim 4, wherein the mode control signal includes at least two mode control bits.

6. The reconfigurable bipolar output charge pump of claim 4, wherein the switch network comprises:

a first switch configured to connect the input terminal to the first terminal;

a second switch configured to connect the first terminal to the first output terminal;

a third switch configured to connect the second terminal to a ground terminal;

a fourth switch configured to connect the second terminal to the first output terminal;

a fifth switch configured to connect the first terminal to the third terminal;

a sixth switch configured to connect the second terminal to the third terminal;

a seventh switch configured to connect the second terminal to the second output terminal;

an eighth switch configured to connect the fourth terminal to the ground terminal; and a ninth switch configured to connect the fourth terminal to the second output terminal.

7. The reconfigurable bipolar output charge pump of claim 6, wherein, when the mode control signal indicates the first charge pump mode, in a first phase, the first switch, the second switch, the third switch, the fifth switch, and the eighth switch are turned on and the fourth switch, the sixth switch, the seventh switch, and the ninth switch are turned off so that the first flying capacitor and second flying capacitor are charged to a voltage level corresponding to the input voltage, and in a second phase, the first switch, the second switch, the third switch, the sixth switch, and the ninth switch are turned on and the fourth switch, the fifth switch, the seventh switch, and the eighth switch switches are turned off so that the positive output voltage having a magnitude corresponding to the input voltage is provided at the first output terminal and the negative output voltage having a magnitude corresponding to the input voltage is provided at the second output terminal.

8. The reconfigurable bipolar output charge pump of claim 6, wherein, when the mode control signal indicates the second charge pump mode, in a first phase, the first switch, the fourth switch, the fifth switch, and the eighth switch are turned on and the second switch, the third switch, the sixth switch, the seventh switch, and the ninth switch are turned off so that the first flying capacitor is charged to a voltage level corresponding to ⅓ of the input voltage and the second flying capacitor is charged to a voltage level corresponding to the input voltage, in a second phase, the third switch, the fifth switch, and the ninth switch are turned on and the first switch, the second switch, the fourth switch, the sixth switch, the seventh switch, and the eighth switch are turned off so that the negative output voltage having a magnitude corresponding to ⅔ of the input voltage is provided at the second output terminal, and in a third phase, the second switch, the sixth switch, and the ninth switch are turned on and the first switch, the third switch, the fourth switch, the fifth switch, the seventh switch, and the eighth switch are turned off so that the positive output voltage having a magnitude corresponding to ⅔ of the input voltage is provided at the first output terminal and the negative output voltage having a magnitude corresponding to ⅔ of the input voltage is provided at the second output terminal.

9. The reconfigurable bipolar output charge pump of claim 6, wherein, when the mode control signal indicates the third charge pump mode, in a first phase, the first switch, the fourth switch, the fifth switch, and the eighth switch are turned on and the second switch, the third switch, the sixth switch, the seventh switch, and the ninth switch are turned off so that the first flying capacitor is charged to a voltage level corresponding to ½ of the input voltage and the second flying capacitor is charged to a voltage level corresponding to the input voltage, and in a second phase, the second switch, the third switch, the fifth switch, and the ninth switch are turned on and the first switch, the fourth switch, the sixth switch, the seventh switch, and the eighth switch are turned off so that the positive output voltage having a magnitude corresponding to ½ of the input voltage is provided at the first output terminal and the negative output voltage having a magnitude corresponding to ½ of the input voltage is provided at the second output terminal.

10. The reconfigurable bipolar output charge pump of claim 6, wherein, when the mode control signal indicates the fourth charge pump mode, in a first phase, the first switch, the fourth switch, the fifth switch, and the eighth switch are turned on and the second switch, the third switch, the sixth switch, the seventh switch, and the ninth switch are turned off so that the first flying capacitor is charged to a voltage level corresponding to ⅔ of the input voltage and the second flying capacitor is charged to a voltage level corresponding to the input voltage, in a second phase, the third, fifth, and ninth switches are turned on and the first, second, fourth, and sixth to eighth switches are turned off so that the negative output voltage having a magnitude corresponding to ⅓ of the input voltage is provided at the second output terminal, and in a third phase, the second and seventh switches are turned on and the first, third to sixth, eighth, and ninth switches are turned off so that the positive output voltage having a magnitude corresponding to ⅓ of the input voltage is provided at the first output terminal and the negative output voltage having a magnitude corresponding to ⅓ of the input voltage is provided at the second output terminal.

11. The reconfigurable bipolar output charge pump of claim 1, further comprising:
a selector configured to receive a plurality of input voltages and provide one of the plurality of input voltages selected according to a selection signal to the input terminal.

12. An integrated circuit, comprising:
a charge pump circuit configured to provide a positive output voltage and a negative output voltage from an input voltage; and
an amplifier configured to receive the positive output voltage and the negative output voltage and to provide an output signal by amplifying an input signal,
wherein the charge pump circuit comprises:
an input terminal configured to receive the input voltage;
first and second terminals configured to be connected to a first flying capacitor;
third and fourth terminals configured to be connected to a second flying capacitor;
first and second output terminals configured to be respectively connected to first and second output capacitors and respectively provide the positive output voltage and the negative output voltage;
a switch network that includes a plurality of switches configured to variably connect the input terminal, the first to fourth terminals, and the first and second output terminals to each other in response to a plurality of switch control signals, and to provide one of a plurality of charge pump modes; and
a controller configured to generate the plurality of switch control signals in response to a mode control signal indicating one of the plurality of charge pump modes so that a magnitude of the positive output voltage and the negative output voltage becomes one of a plurality of predefined voltage levels, and
wherein the switch network comprises:
a first switch configured to connect the input terminal to the first terminal;
a second switch configured to connect the first terminal to the first output terminal;
a third switch configured to connect the second terminal to a ground terminal;
a fourth switch configured to connect the second terminal to the first output terminal;
a fifth switch configured to connect the first terminal to the third terminal;
a sixth switch configured to connect the second terminal to the third terminal;
a seventh switch configured to connect the second terminal to the second output terminal;
an eighth switch configured to connect the fourth terminal to the ground terminal; and
a ninth switch configured to connect the fourth terminal to the second output terminal.

13. The integrated circuit of claim 12, wherein the charge pump circuit further comprises:
a selector configured to receive a plurality of input voltages and provide one of the plurality of input voltages selected according to a selection signal to the input terminal.

14. A reconfigurable bipolar output charge pump, comprising:
an input terminal configured to receive an input voltage;
a first terminal and a second terminal configured to be connected to a first flying capacitor;
a third terminal and a fourth terminal configured to be connected to a second flying capacitor;
a first output terminal and a second output terminal configured to be respectively connected to a first output capacitor and a second output capacitor and respectively provide a positive output voltage and a negative output voltage;
a switch network that includes a plurality of switches configured to variably connect a plurality of the input terminal, the first terminal, the second terminal, the third terminal, the fourth terminal, the first output terminal and the second output terminal to each other in response to a plurality of switch control signals so as to implement a charge pump mode among a plurality of charge pump modes;
a controller configured to generate the switch control signals in response to a mode control signal indicating the charge pump mode to be implemented by the switch control signals so that a magnitude of the positive output voltage and the negative output voltage become a predefined voltage level corresponding to the mode control signal and the charge pump mode to be implemented;
wherein the switch network comprises:
a first switch configured to connect the input terminal to the first terminal;
a second switch configured to connect the first terminal to the first output terminal;
a third switch configured to connect the second terminal to a ground terminal;
a fourth switch configured to connect the second terminal to the first output terminal;
a fifth switch configured to connect the first terminal to the third terminal;
a sixth switch configured to connect the second terminal to the third terminal;
a seventh switch configured to connect the second terminal to the second output terminal;
an eighth switch configured to connect the fourth terminal to the ground terminal; and
a ninth switch configured to connect the fourth terminal to the second output terminal.

15. The reconfigurable bipolar output charge pump of claim 14,
wherein the plurality of switch control signals correspond to at least two phases for the charge pump mode to be implemented, and
wherein the at least two phases correspond to at least a charged state and a discharged state.

16. The reconfigurable bipolar output charge pump of claim 15,
wherein different subsets of the plurality of switches in the switch network are turned ON for each of the at least two phases.

17. The reconfigurable bipolar output charge pump of claim 16, wherein clock signals for controlling each phase do not overlap.

18. The reconfigurable bipolar output charge pump of claim 14, wherein the plurality of charge pump modes comprises:
a first charge pump mode in which the magnitude of the positive output voltage and the negative output voltage is substantially equivalent to the input voltage; and
a second charge pump mode in which the magnitude of the positive output voltage and the negative output voltage is substantially equivalent to 1/m of the input voltage,
wherein m is a positive integer equal to or greater than 2.

19. The reconfigurable bipolar output charge pump of claim 14, further comprising:
a level detector configured to detect the positive output voltage and the negative output voltage and generate a switching frequency control signal for controlling a switching frequency.

20. The reconfigurable bipolar output charge pump of claim 14, wherein the plurality of charge pump modes include at least two of:
a first charge pump mode in which the magnitude of the positive output voltage and the negative output voltage corresponds to the input voltage;
a second charge pump mode in which the magnitude of the positive output voltage and the negative output voltage corresponds to ⅔ of the input voltage;
a third charge pump mode in which the magnitude of the positive output voltage and the negative output voltage corresponds to ½ of the input voltage; and
a fourth charge pump mode in which the magnitude of the positive output voltage and the negative output voltage corresponds to ⅓ of the input voltage.

* * * * *